(12) United States Patent
Wang et al.

(10) Patent No.: US 12,227,085 B2
(45) Date of Patent: Feb. 18, 2025

(54) SMART ADAPTERS AND CONTROLLING METHODS

(71) Applicant: e-Radio USA Inc., Redwood City, CA (US)

(72) Inventors: Jackson Kit Wang, Redwood City, CA (US); Daniel John Glen Nephin, Redwood City, CA (US)

(73) Assignee: E-Radio USA Inc., Redwood City, CA (US)

( * ) Notice: Subject to any disclaimer, the term of this patent is extended or adjusted under 35 U.S.C. 154(b) by 212 days.

(21) Appl. No.: 18/159,366

(22) Filed: Jan. 25, 2023

(65) Prior Publication Data

US 2023/0241977 A1 Aug. 3, 2023

Related U.S. Application Data

(60) Provisional application No. 63/302,745, filed on Jan. 25, 2022.

(51) Int. Cl.
*B60L 53/62* (2019.01)
*B60H 1/00* (2006.01)
*B60L 3/00* (2019.01)
*G07C 5/00* (2006.01)
*H04Q 9/00* (2006.01)

(52) U.S. Cl.
CPC ........ *B60L 3/0023* (2013.01); *B60H 1/00735* (2013.01); *G07C 5/008* (2013.01); *H04Q 9/00* (2013.01); *H04Q 2209/40* (2013.01); *H04Q 2209/60* (2013.01)

(58) Field of Classification Search
CPC .......... B60L 3/00; B60L 3/0023; B60L 53/62; B60L 53/63; G07C 5/00; G07C 5/008; B60H 1/00735
See application file for complete search history.

(56) References Cited

U.S. PATENT DOCUMENTS

| | | | |
|---|---|---|---|
| 7,298,328 B2 | 11/2007 | Wang et al. | |
| 7,809,342 B2 | 10/2010 | Wang | |
| 8,265,576 B2 | 9/2012 | Wang | |
| 8,892,064 B2 | 11/2014 | Wang | |
| 9,419,664 B2 | 8/2016 | Wang | |
| 9,830,629 B2 | 11/2017 | Wang et al. | |
| 2005/0003772 A1 | 1/2005 | Nemoto | |
| 2011/0076991 A1 | 3/2011 | Mueck et al. | |
| 2014/0133656 A1 | 5/2014 | Wurster et al. | |
| 2016/0144728 A1 | 5/2016 | Harper et al. | |
| 2019/0303541 A1 | 10/2019 | Reddy et al. | |
| 2020/0242858 A1* | 7/2020 | Meroux | G08G 1/0141 |
| 2020/0273048 A1 | 8/2020 | Andon et al. | |

(Continued)

*Primary Examiner* — Tan Q Nguyen

(57) ABSTRACT

Disclosed are smart adapters and methods for regulating system based at least in part on utility information. An adapter generally includes a receiver and a controller. The receiver is configured to receive one or more datacasts each containing utility information. The controller is configured to control a signal at a terminal of the system based at least in part on utility information. Once the adapter is plugged in, it starts reacting to real time validated information, and provides automatic communication and operations. The smart adapters and methods are easy and simple to install and have backwards/forward compatibility with a variety of existing systems.

21 Claims, 14 Drawing Sheets

(56) References Cited

U.S. PATENT DOCUMENTS

| | | |
|---|---|---|
| 2020/0351089 A1 | 11/2020 | Wentz |
| 2022/0237711 A1* | 7/2022 | Frolik .................. H02J 3/14 |
| 2023/0001820 A1* | 1/2023 | Ehara .................. B60L 53/65 |
| 2023/0093349 A1* | 3/2023 | Powell ................ G01R 31/367 |
| | | 701/22 |

* cited by examiner

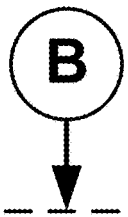

*(1022)* wherein the first system is a plug-in electric vehicle (PEV), the second system is an electric vehicle supply equipment (EVSE), the determining C) determines whether the utility information contains a condition that restrains the EVSE from supplying electric energy to the PEV, and the controlling D) controls, when it is determined that the utility information contains a condition that restrains the EVSE from supplying the electric energy to the PEV, a signal at the first outlet terminal in a plurality of first outlet terminals of the EVSE to regulate the EVSE based at least in part on the extracted utility information and the PEV

*(1024)* I) obtaining information regarding whether the EVSE is ready to supply electric energy to the PEV, whether the PEV is ready to accept the electric energy from the EVSE, and/or whether a user of the PEV has provided an override instruction

*(1026)* the obtaining I) is performed prior to the determining C)

*(1028)* the obtaining I) is performed subsequent to the determining C) but prior to the controlling D)

*(1030)* J) relinquishing control over the signal at the first outlet terminal to the PEV and/or EVSE, if it is determined that the EVSE is not ready to supply the electric energy to the PEV, the PEV is not ready to accept the electric energy from the EVSE, and/or the user of the PEV has provided an override instruction

*(1032)* K) evaluating one or more signals at a plurality of one or more points on a control pilot circuit, and a proximity circuit or both of the control pilot circuit and proximity circuit formed collectively by the PEV and EVSE to detect one or more failure conditions, if it is determined that the EVSE is not ready to supply the electric energy to the PEV, and/or the PEV is not ready to accept the electric energy from the EVSE

FIG. 10C

SMART ADAPTERS AND CONTROLLING METHODS

CROSS-REFERENCE TO RELATED APPLICATION

The present application claims priority to U.S. Provisional Patent Application No. 63/302,745 filed Jan. 25, 2022. The disclosure of the application is incorporated herein for all purposes by reference in its entirety.

TECHNICAL FIELD

The present disclosure relates to smart adapters and methods for controlling systems based at least in part on utility information.

BACKGROUND

Plug-in electric vehicles (PEVs), including plug-in hybrid electric vehicles, battery electric vehicles, and extended range electric vehicles, are configured to be recharged using an electric vehicle supply equipment (EVSE). However, many PEVs and/or EVSEs do not have the ability to participate in smart charging programs, such as those specified in SAE J2847 (e.g., time of use, demand response load control programs, real time pricing, critical peak pricing, regulation services).

Some adapters have been developed, aiming to help users in optimizing the charging of PEVs to minimize electricity costs. For instance, U.S. Pat. Pub. No. 2016/0144728 A1 to Harper et al. teaches an adapter that includes electronic components structured to receive electrical power from the EVSE via the first coupler and supply the electrical power to the PEV via the second coupler and that is configured to measure and/or control a charging parameter of a charge session of the PEV. However, the adapter taught by Harper is overly complex, inflexible, or ineffective.

Given the above background, there remains a need for a simply, more versatile and more effective approach that provides capabilities not only in optimizing/customizing the charging of the PEVs but also in optimizing/customizing of the power usage of other systems.

SUMMARY

The present disclosure addresses the above mentioned drawbacks and/or other issues by configuring smart adapters and methods to control a signal at a terminal of a system based at least in part on available utility information. The smart adapters and methods of the present disclosure are easy and simple to install and have backwards/forward compatibility with a variety of existing systems. Once an adapter is plugged in, it starts reacting to real time validated information, and provides automatic communication and operations.

In various embodiments, the present disclosure provides an adapter comprising a receiver and a controller. The receiver is configured to receive one or more datacasts broadcasted by a wide-area communication system, each of the one or more datacasts comprising utility information. The controller is in electrical communication with the receiver and is configured to be electrically coupled with a first system and a second system. Moreover, the controller is configured to extract the utility information from each of the one or more datacasts received by the receiver or obtain the utility information from the receiver. The controller is also configured to determine whether the utility information, the adapter, the first system, the second system, or a combination thereof contains a condition that restrains the second system from performing an operation. The controller is further configured to control, when it is determined that the utility information, the adapter, the first system, the second system, or a combination thereof contains a condition that restrains the second system from performing the operation, a signal at a first terminal in a plurality of terminals of the second system to regulate the second system based at least in part on the extracted utility information.

In some embodiments, the receiver comprises an antenna. In some such embodiments, the antenna is a wire, or a housing of the adapter. In some embodiments, the receiver comprises an RDS/RBDS or IBOC radio receiver.

In some embodiments, a datacast in the one or more datacasts is carried by an analog cellular signal, a digital cellular signal, a general packet radio service signal, an enhanced data rate for GSM evolution (EDGE) service signal, a Mobitex signal, two-way paging signal, a signal in the Ardis network, a satellite signal, a WiMAX signal, an AM carrier wave, a high definition radio carrier wave, a TV signal, or a satellite radio signal. In some embodiments, a datacast in the one or more datacasts is carried by an FM carrier wave or a signal in a frequency range between 160 MHz and 167 MHz. In some embodiments, a datacast in the one or more datacasts is carried on a sideband or subcarrier frequency of a carrier wave. In some embodiments, a datacast in the one or more datacasts is carried by a local area network (LAN) carrier, such as WiFi and/or Bluetooth. A datacast in the one or more datacasts is responsive to a frequency adjustment made by a utility provider in order to match actual demand to that of available power generating resources.

In some embodiments, the one or more datacasts are received by the receiver on a recurring or periodic basis.

In some embodiments, the utility information comprises electric grid load information or electric tariff information. In some such embodiments, the electric tariff information is a qualified power tariff data set comprising a price per unit energy consumed, commencement and expiry time points, one or more applicable geographical areas, one or more applicable electrical grid areas or networks, or any combination thereof.

In some embodiments, the controller controls the signal at the first terminal in the plurality of terminals of the second system to pause, delay, or stop the operation if it is determined that the utility information contains a condition that restrains the second system from performing the operation. In some embodiments, the restraining of the second system from performing the operation is conducted in a most optimal way in accordance with one or more user's goals. In some embodiments, the condition that restrains the second system from performing the operation comprises (i) during a period of peak demand, (ii) when a real-time price is higher than an acceptable price preset by a user of the first or second system, (iii) signal interruption, (iv) switches being "normally closed", (v) the adapter being "fail safe" or "fail to normal", (vi) the first system being "fail safe" or "fail to normal", (vii) the second system being "fail safe" or "fail to normal", or any combination thereof.

In some embodiments, the first terminal in the plurality of terminals of the second system is a control pilot terminal, and the controlled signal is a voltage at the control pilot terminal. In some such embodiments, the voltage at the control pilot terminal is set to a high voltage if it is determined that the utility information contains a condition that restrains the second system from performing the operation. For instance, in some embodiments, the voltage at the control pilot terminal is set to 9 V if it is determined that the utility information contains a condition that restrains the second system from performing the operation.

In some embodiments, the controller is further configured to relinquish control over the signal at the first terminal in the plurality of terminals of the second system to the first system, the second system or both, if it is determined that the utility information, the adapter, the first system, the second system, or a combination thereof contains no condition that restrains the second system from performing the operation.

In some embodiments, the adapter further includes a user interface, a communication interface, an indicator, a first coupler, a second coupler, or any combination thereof. The user interface is in electrical communication with the controller for (i) notifying, on a remote device, a user of the first or second system the utility information, a state of the first system, a status of the first system, a state of the second system, a status of the second system, any failure condition, or any combination thereof, and/or (ii) receiving an instruction from the user of the first or second system. The communication interface is in electrical communication with the controller and in wireless or wired communication with a remote device for (i) notifying, on the remote device, a user of the first or second system the utility information, a state of the first system, a status of the first system, a state of the second system, a status of the second system, any failure condition, or any combination thereof, and/or (ii) receiving an instruction from the user of the first or second system. In some embodiments, the remote device is a smart watch, a mobile phone, a tablet, a laptop computer or a desktop computer. The indicator is configured to indicate whether a validated FM carrier is detected, whether a validated utility message channel (UMC) is detected, whether data from the validated UMC is received, what a quality of signal is, or any combination thereof. In some embodiments, the quality of signal is represented by a packet error rate. In some embodiments, the data from the validated UMC comprises a description of overall utility load, current availabilities of alternative electrical energy supplies, critical price points (CPPs), critical weather warnings, or a combination thereof. The first coupler is configured to electrically couple the controller with the first system and the second coupler is configured to electrically couple the controller with the second system.

In some embodiments, the receiver, the controller or both are integrated with or embedded in the first system. In some embodiments, the receiver, the controller or both are integrated with or embedded in the second system.

In some embodiments, the first system is a plug-in electric vehicle (PEV), the second system is an electric vehicle supply equipment (EVSE). In some such embodiments, the controller is configured to determine whether the utility information contains a condition that restrains the EVSE from supplying electric energy to the PEV. The controller is also configured to control, when it is determined that the utility information contains a condition that restrains the EVSE from supplying the electric energy to the PEV, a signal at a first outlet terminal in a plurality of first outlet terminals of the EVSE to regulate the EVSE based at least in part on the extracted utility information and the PEV. In some embodiments, when it is determined that the utility information contains a condition that restrains the EVSE from supplying the electric energy to the PEV, the controller causes the signal at the first outlet terminal of the EVSE to be at a level indicative to the EVSE that the PEV is connected but not ready for charging.

In some embodiments, the controller is further configured to obtain information regarding whether the EVSE is ready to supply the electric energy to the PEV, whether the PEV is ready to accept the electric energy from the EVSE, and/or whether a user of the PEV has provided an override instruction. In some such embodiments, the controller is further configured to relinquish control over the signal at the first outlet terminal in the plurality of first outlet terminals of the EVSE to the PEV, the EVSE or both, if it is determined that the EVSE is not ready to supply the electric energy to the PEV, the PEV is not ready to accept the electric energy from the EVSE, the user of the PEV has provided an override instruction, or any combination thereof.

In some embodiments, the controller is further configured to evaluate one or more signals at one or more points on a control pilot circuit, a proximity circuit or both of the control pilot circuit and proximity circuit formed collectively by the PEV and EVSE to detect one or more failure conditions, if it is determined that the EVSE is not ready to supply the electric energy to the PEV, the PEV is not ready to accept the electric energy from the EVSE, or any combination thereof. In some such embodiments, the controller is configured to evaluate signals at 4 points on the control pilot circuit and 5 points on the proximity circuit. In some embodiments, the signals to be evaluated are voltages at the plurality of points on the control pilot circuit and the proximity circuit. In some embodiments, the one or more signals facilitate local intelligence or cloud based intelligence and adaptive behavior.

In some embodiments, the first coupler is a first plug configured to be removably coupled with an inlet port of the PEV, and the second coupler is a second plug configured to be removably coupled with an outlet port of the EVSE. The inlet port of the PEV comprises a plurality of inlet terminals, and the outlet port of the EVSE comprises the plurality of outlet terminals. When the first plug is coupled with the inlet port of the PEV and the second plug is coupled with the outlet port of the EVSE, the controller is electrically coupled with the plurality of inlet terminals of the PEV and the plurality of outlet terminals of the EVSE. In some such embodiments, the inlet port of the PEV is one of a J1772 port, a Mennekes port, a GB/T port, a CCS1 port, a CCS2 port, a CHAdeMo port and a Tesla port, and the outlet port of the EVSE is one of one of a J1772 port, a Mennekes port, a GB/T port, a CCS1 port, a CCS2 port, a CHAdeMo port and a Tesla port.

In some embodiments, the adapter includes a cable connecting the first and second plugs and serving as an antenna for the receiver. In some such embodiments, the antenna is a ¼, ½, or ⅝ wave antenna, or a combination thereof.

In some embodiments, the first system is a thermostat and the second system is an appliance. In some such embodiments, the controller is configured to determine whether the utility information contains a condition that restrains the appliance from operating based solely on the thermostat. The controller is also configured to control, when it is determined that the utility information contains a condition that restrains the appliance from operating based solely on the thermostat, a signal at a first terminal in a plurality of terminals of the appliance to regulate the appliance based at least in part on the extracted utility information and the thermostat.

In some embodiments, the appliance is a heating, ventilation and air conditioning system (HVAC). In some embodiments, the thermostat is a programmable communication thermostat or non-programmable communication thermostat. In some embodiments, the number of the plurality of terminals of the appliance is the same as a plurality of terminals of the thermostat. In some embodiments, at least two terminals in the plurality of terminals of the appliance are electrically connected to each other.

In some embodiments, the adapter is configured to be hidden inside a dry wall with a pigtail antenna for the receiver disposed outside of the dry wall. In some embodiments, the adapter is configured to be installed on a motherboard of the thermostat, an above ground adapter plate or a removable/relocatable module.

In some embodiments, the adapter further includes a sensor to monitor a temperature of a space, a zone, a room, or a section.

In various embodiments, the present disclosure provides an adapter for regulating charging of a plug-in electric vehicle (PEV). The adapter includes a first plug, a second plug, a receiver and a controller. The first plug is configured to be removably coupled with an inlet port of the PEV, and the second plug is configured to be removably coupled with an outlet port of the EVSE. The inlet port of the PEV comprises a plurality of inlet terminals and the plurality of inlet terminals comprises a control pilot terminal. The outlet port of the EVSE comprises a plurality of outlet terminals. The receiver is configured to receive one or more datacasts broadcasted by a wide-area wireless communication system, each of the one or more datacasts comprising utility information. The controller is in electrical communication with the receiver, and configured to be electrically coupled with the plurality of inlet terminals of the PEV and the plurality of outlet terminals of the EVSE when the first plug is coupled with the inlet port of the PEV and the second plug is coupled with the outlet port of the EVSE. In some such embodiments, the controller is configured to extract the utility information from each of the one or more datacasts received by the receiver, and control a signal at the control pilot terminal of the EVSE to regulate charging of the PEV based at least in part on the extracted utility information. In some embodiments, the adapter further includes a cable connecting the first and second plugs and serving as an antenna for the receiver.

In various embodiments, the present disclosure provides a method performed in an adapter comprising a receiver and a controller. The controller is in electrical communication with the receiver and configured to be electrically coupled with a first system and a second system. The method comprises A) receiving, by the receiver, one or more datacasts broadcasted by a wide-area wireless communication system, each of the one or more datacasts comprising utility information. The method also includes B) extracting, by the controller, the utility information from each of the one or more datacasts received by the receiver. The method further includes C) determining, by the controller, whether the utility information, the adapter, the first system, the second system, or a combination thereof contains a condition that restrains the second system from performing an operation. In addition, the method includes D) controlling, by the controller, if it is determined that the utility information, the adapter, the first system, the second system, or a combination thereof contains a condition that restrains the second system from performing the operation, a signal at a first terminal in a plurality of terminals of the second system to regulate the second system based at least in part on the extracted utility information.

In some embodiments, the method further includes E) relinquishing control over the signal at the first terminal in the plurality of terminals of the second system to the first system, the second system or both, if it is determined that the utility information, the adapter, the first system, the second system, or a combination thereof contains no condition that restrains the second system from performing the operation.

In some embodiments, the adapter comprises a user interface in electrical communication with the controller or a communication interface in electrical communication with the controller and in wireless or wired communication with a remote device. In some such embodiments, the method further includes F) notifying, at the user interface or the remote device, a user of the first or second system the utility information, a state of the first system, a status of the first system, a state of the second system, a status of the second system, any failure condition, or any combination thereof. In some embodiments, the method further includes G) receiving, through the user interface or the remote device, an instruction from the user of the PEV.

In some embodiments, the adapter comprises an indicator. In some such embodiments, the method further includes H) indicating, through the indicator, whether a validated FM carrier is detected, whether a validated utility message channel (UMC) is detected, whether data from the validated UMC is received, what a quality of signal is, or any combination thereof.

In some embodiments, the first system is a plug-in electric vehicle (PEV) and the second system is an electric vehicle supply equipment (EVSE). In some such embodiments, the determining C) determines whether the utility information contains a condition that restrains the EVSE from supplying electric energy to the PEV. The controlling D) controls, when it is determined that the utility information contains a condition that restrains the EVSE from supplying the electric energy to the PEV, a signal at the first outlet terminal in a plurality of first outlet terminals of the EVSE to regulate the EVSE based at least in part on the extracted utility information. In some embodiments, the method further includes I) obtaining information regarding whether the EVSE is ready to supply electric energy to the PEV, whether the PEV is ready to accept the electric energy from the EVSE, and/or whether a user of the PEV has provided an override instruction. In some embodiments, the obtaining I) is performed prior to the determining C). In some other embodiments, the obtaining I) is performed subsequent to the determining C) but prior to the controlling D).

In some embodiments, the method further includes J) relinquishing control over the signal at the first outlet terminal to the PEV and/or EVSE, if it is determined that the EVSE is not ready to supply the electric energy to the PEV, the PEV is not ready to accept the electric energy from the EVSE, and/or the user of the PEV has provided an override instruction.

In some embodiments, the method further includes K) evaluating one or more signals at one or more points on a control pilot circuit, a proximity circuit or both of the control pilot circuit and proximity circuit formed collectively by the PEV and EVSE to detect one or more failure conditions, if it is determined that the EVSE is not ready to supply the electric energy to the PEV, and/or the PEV is not ready to accept the electric energy from the EVSE. In some embodiments, the evaluating K) comprises evaluating 4 points on the control pilot circuit and 5 points on the proximity circuit. In some embodiments, the signals to be evaluated are voltages at the plurality of points on the control pilot circuit and the proximity circuit.

The adapters and methods of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

BRIEF DESCRIPTION OF THE DRAWINGS

The accompanying drawings, which are incorporated into and constitute a part of this specification, illustrate one or more exemplary embodiments of the present disclosure and, together with the Detailed Description, serve to explain the principles and implementations of exemplary embodiments of the invention. The accompanying drawings are not necessarily to scale. The specific design features of the present invention as disclosed herein, including, for example, specific dimensions, orientations, locations, and shapes will be determined in part by the particular intended application and use environment. In addition, the components illustrated in the figures are combinable in any useful number and combination.

FIGS. 10A, 10B and 10C are flowcharts collectively illustrating an exemplary method, in which preferred parts of the method are shown in solid line boxes whereas additional, optional, or alterative parts of the method are shown in dashed line boxes, in accordance with some embodiments of the present disclosure.

Like reference numerals refer to corresponding parts throughout the several views of the drawings.

DETAILED DESCRIPTION

Figure 1:
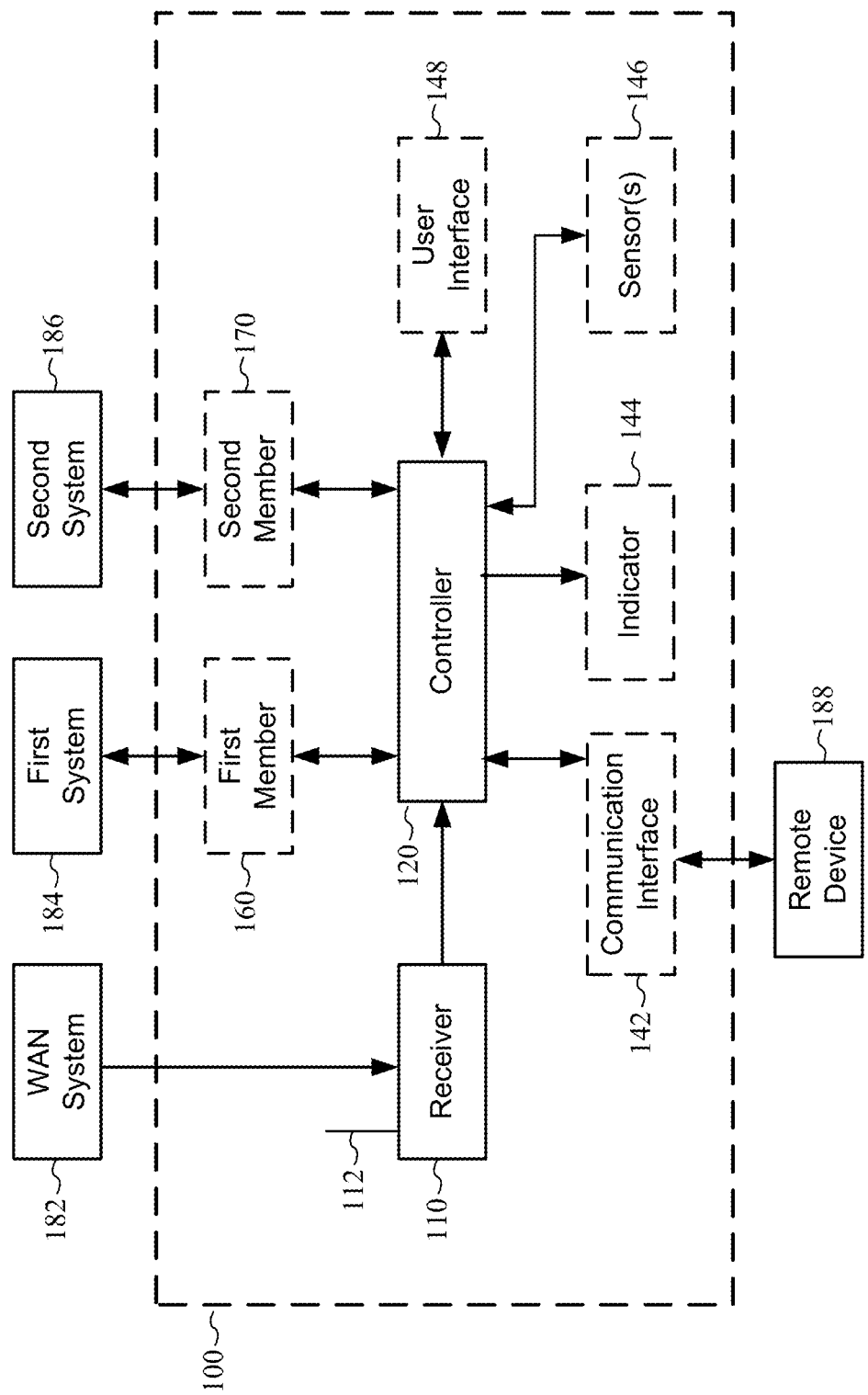
FIG. 1 is a block diagram illustrating an exemplary adapter in accordance with some embodiments of the present disclosure.

Disclosed are smart adapters and methods for controlling systems based at least in part on utility information. In various embodiments, the smart adapters and methods are configured for use with existing systems (e.g., devices, equipment, apparatuses, appliances, vehicles, gadgets). A smart adapter generally includes a receiver to receive one or more datacasts that include utility information and a controller to regulate a system based at least in part on the utility information by controlling a signal at a terminal of the system. As such, the smart adapters of the present disclosure are easy and simple to install and have backwards/forward compatibility. For instance, the adapters can be plugged in, and no other action is required. Once an adapter is plugged in, it starts reacting to real time validated information, and provides automatic communication and operations. The smart adapters of the present disclosure are backwards and forward compatible with a variety of existing systems. Examples of smart adapters include, but are not limited to, adapters for existing plug-in electric vehicle (EV or PEV) and electric vehicle supply equipment (EVSE), for thermostat and heating, ventilation and air conditioning system (HVAC) equipment, or the like.

In some embodiments, at least some components (e.g., receiver, controller) of an adapter of the present disclosure can be embedded in or integrated with (e.g., retrofitted in) an existing system. In some embodiments, at least some components (e.g., receiver, controller) of an adapter of the present disclosure can be installed in a brand new system and become an integral part of the new system.

Before the invention is described in greater detail, it is to be understood that the invention is not limited to particular embodiments described herein as such embodiments may vary. It is also to be understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

It is noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method may be carried out in the order of events recited or in any other order that is logically possible.

As used in the description of the implementations and the appended claims, the singular forms "a", "an" and "the" are intended to include the plural forms as well, unless the context clearly indicates otherwise. It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without changing the meaning of the description, so long as the "first element" and the "second element" are renamed consistently.

The term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term "about" or "approximately" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

The term "if" used herein is, optionally, construed to mean "when" or "upon" or "in response to determining" or "in response to detecting" or "in accordance with a determination that," depending on the context. Similarly, the phrase "if it is determined" or "if [a stated condition or event] is detected" used herein is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

FIG. 1 illustrates an exemplary adapter 100 in accordance with some embodiments of the present disclosure. The adapter 100 includes a receiver 110 configured to receive one or more datacasts broadcasted by a wide-area communication system 182. Examples of wide-area communication systems include, but are not limited to: analog cellular (e.g., TIA 464B dual-tone multi-frequency, analog modem), digital cellular such as cellular digital packet data (CDPD), general packet radio services (GPRS), enhanced data rates for GSM evolution (EDGE), Mobitex, two-way paging (e.g., ReFlex), the Ardis network, satellite (e.g., TDM/TDMA X.25 VSAT networks), WiMAX (IEEE 802.16 MAN, hereby incorporated by reference), and networked AM, FM, high definition radio, TV and satellite radio broadcast systems, as well as use of radio frequencies in the range of 160 MHz to 167 MHz, including any subsidiary communications multiplex operation sub-carriers offered by any of the aforementioned systems. These and other networked radio/data broadcast systems or wireless wide area network (WAN) systems are collectively termed herein as the "wide-area communication system". The wide-area communication system can broadcast other information in addition to the one or more datacasts.

In some embodiments, a datacast in the one or more datacasts is carried by an analog cellular signal, a digital cellular signal, a general packet radio service signal, an enhanced data rate for GSM evolution (EDGE) service signal, a Mobitex signal, two-way paging signal, a signal in the Ardis network, a satellite signal, a WiMAX signal, an AM carrier wave, a high definition radio carrier wave, a TV signal, or a satellite radio signal. In some embodiments, a datacast in the one or more datacasts is carried by an FM carrier wave or a signal in a frequency range between 160 MHz and 167 MHz. In some embodiments, a datacast in the one or more datacasts is carried on a sideband or subcarrier frequency of a carrier wave. In some embodiments, a datacast in the one or more datacasts is carried by a local area network (LAN) carrier, such as WiFi and/or Bluetooth. In some embodiments, a datacast in the one or more datacasts is responsive to a frequency adjustment made by a utility provider in order to match actual demand to that of available power generating resources.

The wide-area communication system 182 may be used by utility companies, energy distributors or any other entities who want to convey datacasts. In various embodiments, the one or more datacasts include utility information. In some embodiments, the one or more datacasts consist of the utility information. In some other embodiments, the one or more datacasts include other data (e.g., weather forecasting information) in addition to the utility information. Examples of the utility information include, but are not limited to, power tariff information, pricing, load, consumer electronics control (CEC), greenhouse gases (GHG), electrical grid information, grid status, gas rates, or water rates. For instance, in some embodiments, the utility information comprises electric grid load information or electric tariff information. In some such embodiments, the electric tariff information is a qualified power tariff data set comprising a price per unit energy consumed, commencement and expiry time points, one or more applicable geographical areas, one or more applicable electrical grid areas or networks, or any combination thereof.

The receiver 110 can be a radio (either AM or FM) receiver, an In-Band On-Channel (IBOC) receiver, any other suitable receiver, or a combination thereof. For instance, in some embodiments, the receiver 110 is or includes an FM radio receiver for receiving datacasting information through the Europe and European Radio Data System (RDS) standard published by the European Committee for Electrotechnical Standardization in 1998, the North American radio broadcast data system (RBDS) specification, or both. In some embodiments, the receiver 110 is or includes an IBOC receiver for receiving datacasting information from digital signals that are broadcast as "sideband" transmissions bracketing the top and bottom of a host analog radio signal in order to make optimal usage of the current spectrum allocations.

In various embodiments, the receiver 110 is able to receive the one or more datacasts directly from the wide-area communication system 182, without reliance on additional local area networks or other communications infrastructure at the premises of the receiver. In some embodiments, the receiver includes a wireless utility message channel (UMC) service in communication with the wide-area communication system 182. In some embodiments, the receiver includes an antenna 112 to facilitate communication with the wide-area communication system 182. The antenna can be made of a wire or a housing of the adapter or a combination thereof.

Figure 2:
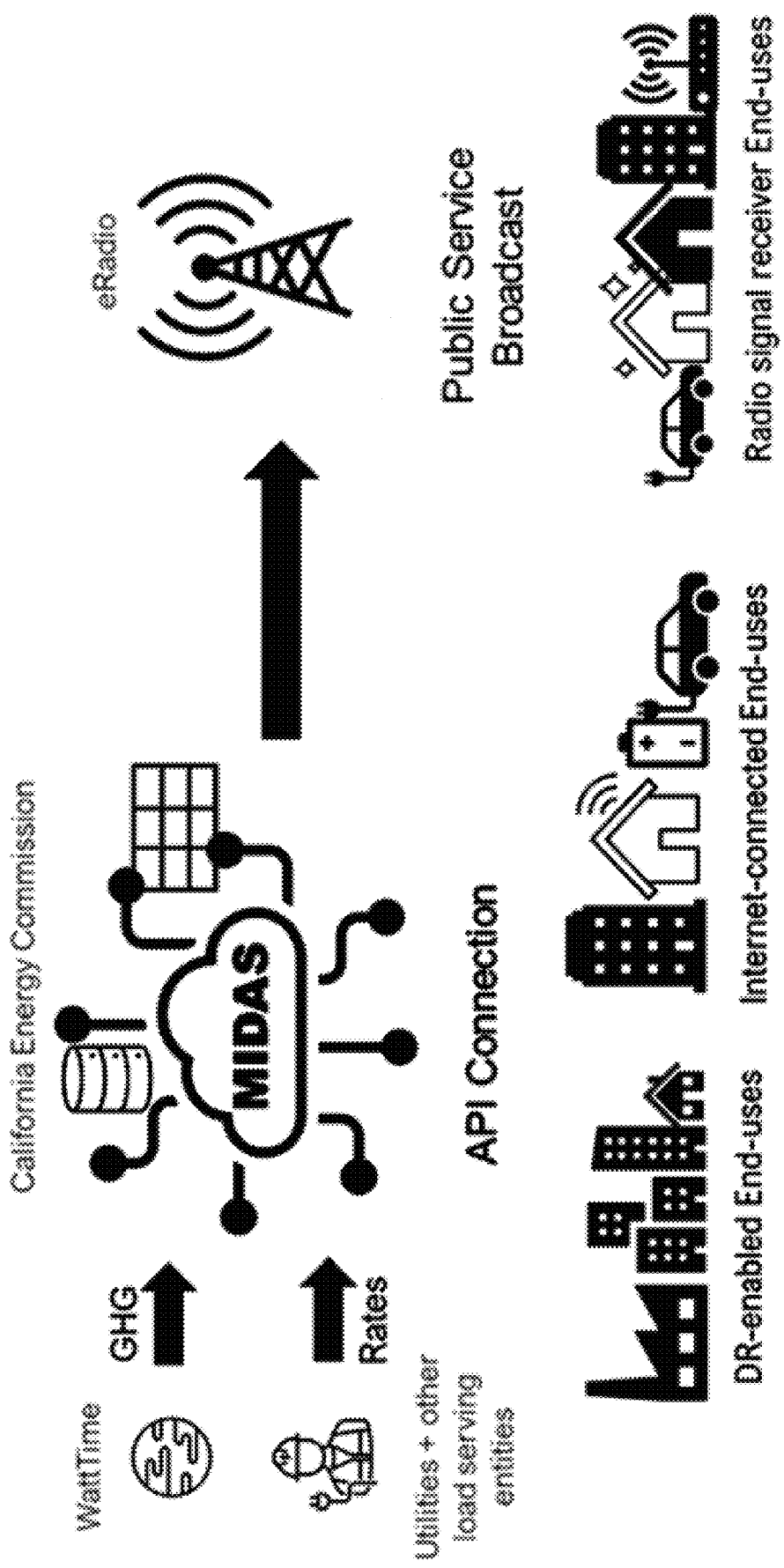
FIG. 2 illustrates an exemplary path, in which data flows from utility and/or other entities to a server, a broadcast and end users.

In some embodiments, the receiver 110 is capable of receiving broadcast, such as e-Radio UMC FM broadcast, with optional WiFi/LTE and ANSI/CTA-2045 functions, as illustrated in FIG. 2. ANSI/CTA-2045 (formerly CEA-2045) specifies a modular communications interface (MCI) to facilitate communications with residential devices for applications such as energy management. The MCI provides a standard interface for energy management signals and messages to reach devices. In FIG. 2, MIDAS stands for the California Energy Commission's (CEC) Market Informed Demand Automation Server, which is a database of current, future, and historic time-varying rates, greenhouse gas (GHG) emissions associated with electrical generation, and California Flex Alert Signals. The database is populated by electric load serving entities (LSEs), WattTime's Self-Generation Incentive Program (SGIP) application programming interface (API), the California Independent System Operator (California ISO), and other entities that are registered with the MIDAS system. MIDAS is accessible through a public API at https://midasapi.energy.ca.gov in two standard machine-readable formats: extensible markup language (XML), and JavaScript Object Notation (JSON). MIDAS querying is public and accessible to all registered users.

In some embodiments, the receiver 110 receives the one or more datacasts on a periodic or otherwise recurring basis in order to extract up-to-date utility information. In some embodiments, at least some utility information (e.g., pricing) is valid immediately upon receipt, for a specific duration of time (e.g., at least one minute, at least five minutes, at least one half hour, at least one hour, less than 24 hours, less than two days, between one day and a week, two weeks or less, or a month or less), commencing at a future time point (e.g., in an hour, in a day, in a week, etc.), or cyclic or otherwise recurring in time. In some embodiments, the receive 110 scans all available frequencies and allow for continuous reception of data from available information systems such as RDS and/or RBDS, which are collectively referred to herein as the wide-area communication system 182. In some embodiments, the adapter or receiver includes multi-radio circuits, e.g., modules complying CTA-2045, to scan multiple or all available frequencies.

As the receiver (e.g., the FM receiver) can auto-scan to pick up and authenticate the source, no other action is required by the user. The user may use other means to select particular modes or utility pricing from the "default", for instance, using a phone app via Bluetooth or WiFi or Cellular. The default location may make use of a spectral scan signature to determine the approximate location autonomously as a further means to authenticate the source. Additional information regarding applicable receivers and additional features associated with the receiver may be found, for example, in U.S. Pat. No. 8,183,995, issued May 22, 2012 and U.S. Pat. No. 8,704,678, issued Apr. 22, 2014, each of which is hereby incorporated by reference in its entirety.

The adapter 100 also includes a controller 120 in electrical communication with the receiver 110. The controller 120 is configured to be electrically coupled with a first system 184 and a second system 186. The electrical coupling of the controller with the first or second system can be wire or wireless (e.g., using a wire, a cable, a plug, a connector, or a network). For instance, in some embodiments, the adapter 100 includes a first coupler 160 to electrically couple the controller with the first system and a second coupler 170 to electrically couple the controller with the second system. The first or second coupler can be a connector (e.g., a plug, a port) with a plurality of pins or channels, or wires (e.g., cables), or the like.

When electrically coupled with the first system 184 and the second system 186, the controller automatically regulates the first system 184, the second system 186, or both based at least in part on the utility information. For instance, in some embodiments, the controller extracts the utility information from each of the one or more datacasts received by the receiver. Alternatively, in some embodiments, the receiver, instead of the controller, extracts the utility information from each of the one or more datacasts, and the controller obtains the utility information from the receiver. For instance, in some embodiments, the controller or the receiver includes a utility message channel (UMC) application filter to extract the utility information from each of the one or more datacasts. Examples of such filters may be found, for example, in U.S. Pat. No. 8,183,995, issued May 22, 2012 and U.S. Pat. No. 8,704,678, issued Apr. 22, 2014, each of which is hereby incorporated by reference in its entirety. In some embodiments, the UMC application filter is operable to continuously scan through the data received by the receiver 110 in search for UMC data as identified by a unique open data applications (ODA) identifier as assigned by an applicable RDS/RBDS regulatory authority.

After extracting or obtaining the utility information, the controller 120 determines whether the utility information, the adapter, the first system, the second system, or a combination thereof contains a condition that restrains the second system from performing an operation (e.g., restrains the second system from be charged). For instance, in some embodiments, the controller analyzes the utility information to determine if the real time pricing, critical peak pricing, grid status (e.g., whether there are high grid stress and overload situations during peaks and with failures) or any other information from the utility information would restrain the second system from performing an operation. Additionally or optionally, in some embodiments, the controller analyzes the state or status of the adapter, the first system, the second system and/or any other systems involved in the operation to determine if there is any safety issue or any failure of any component or system that would restrain the second system from performing an operation. Additionally or optionally, in some embodiments, the controller determines if there is any regulation and/or compliance that would restrain the second system from performing an operation.

In some embodiments, the condition that restrains the second system from performing the operation comprises (i) during a period of peak demand, (ii) when a real-time price is higher than an acceptable price preset by a user of the first or second system, (iii) signal interruption, (iv) switches being "normally closed", (v) the adapter being "fail safe" or "fail to normal", (vi) the first system being "fail safe" or "fail to normal", (vii) the second system being "fail safe" or "fail to normal", or any combination thereof. Examples of a condition during a period of peak demand include, but are not limited to, the grid in high grid stress and overload situations. Examples of signal interruption include, but are not limited to, signal interruption between the receiver and the WAN system, signal interruption between the controller and the first system, or signal interruption between the controller and the second system. A "normally closed" switch refers to a relevant switch in the first system, the second system and/or the controller that current can flow through it when the switch has not been activated. When activated it will break the circuit and stop current flow.

When it is determined that the utility information, the adapter, the first system, the second system, or a combination thereof contains a condition that restrains the second system from performing the operation, the controller 120 controls a signal at a first terminal in a plurality of terminals of the second system to regulate the second system based at least in part on the extracted utility information. As used herein, the term "terminal" of a system refers to a point (e.g., a terminal pin, a terminal end, a feedthrough, a port, or the like) at which an external circuit can be connected to the system thereby forming an electrical connection between the system and the external circuit. Because the controller 120 controls a signal at a terminal of the second system, the adapter of the present disclosure can be easily installed, can regulate the first or second system without requiring any modification to the first and second systems, and can be configured for use with various different systems or different applications.

Figure 3:
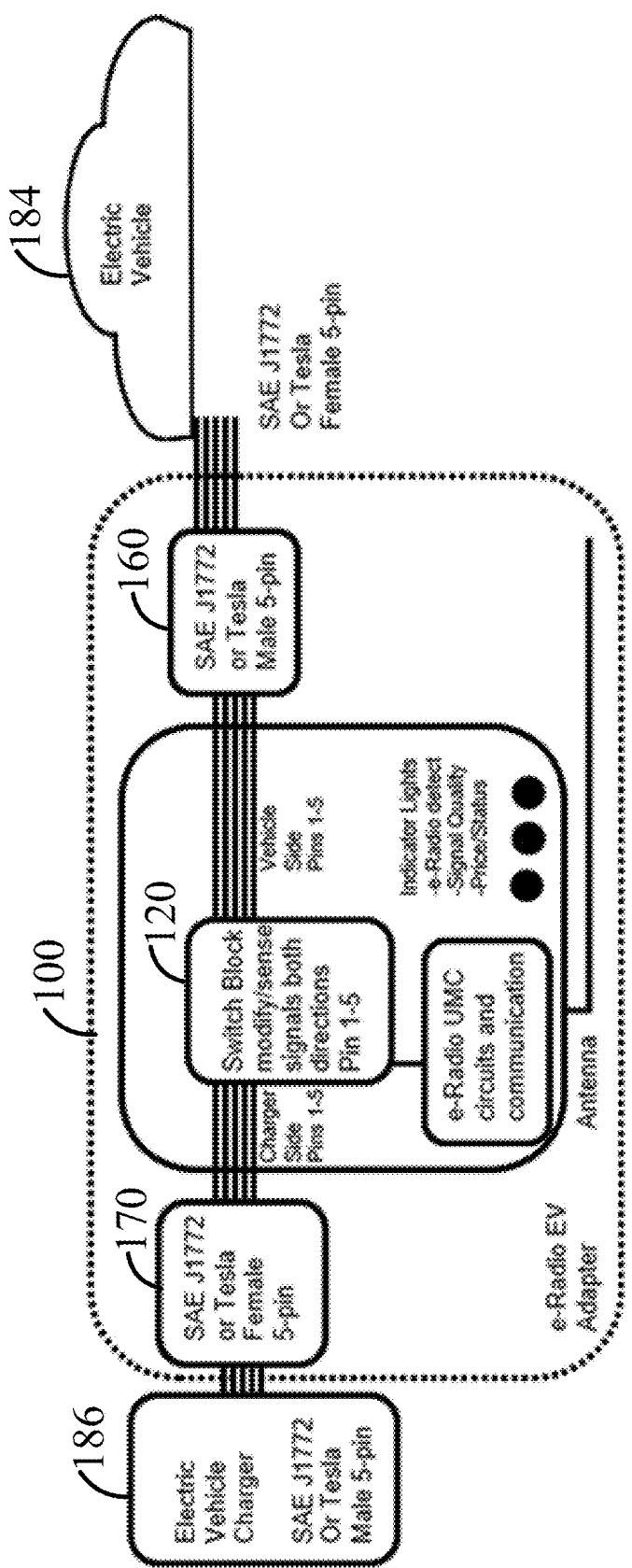
FIG. 3 is a block diagram illustrating an exemplary adapter in use with an electric vehicle in accordance with some embodiments of the present disclosure.
Figure 4:
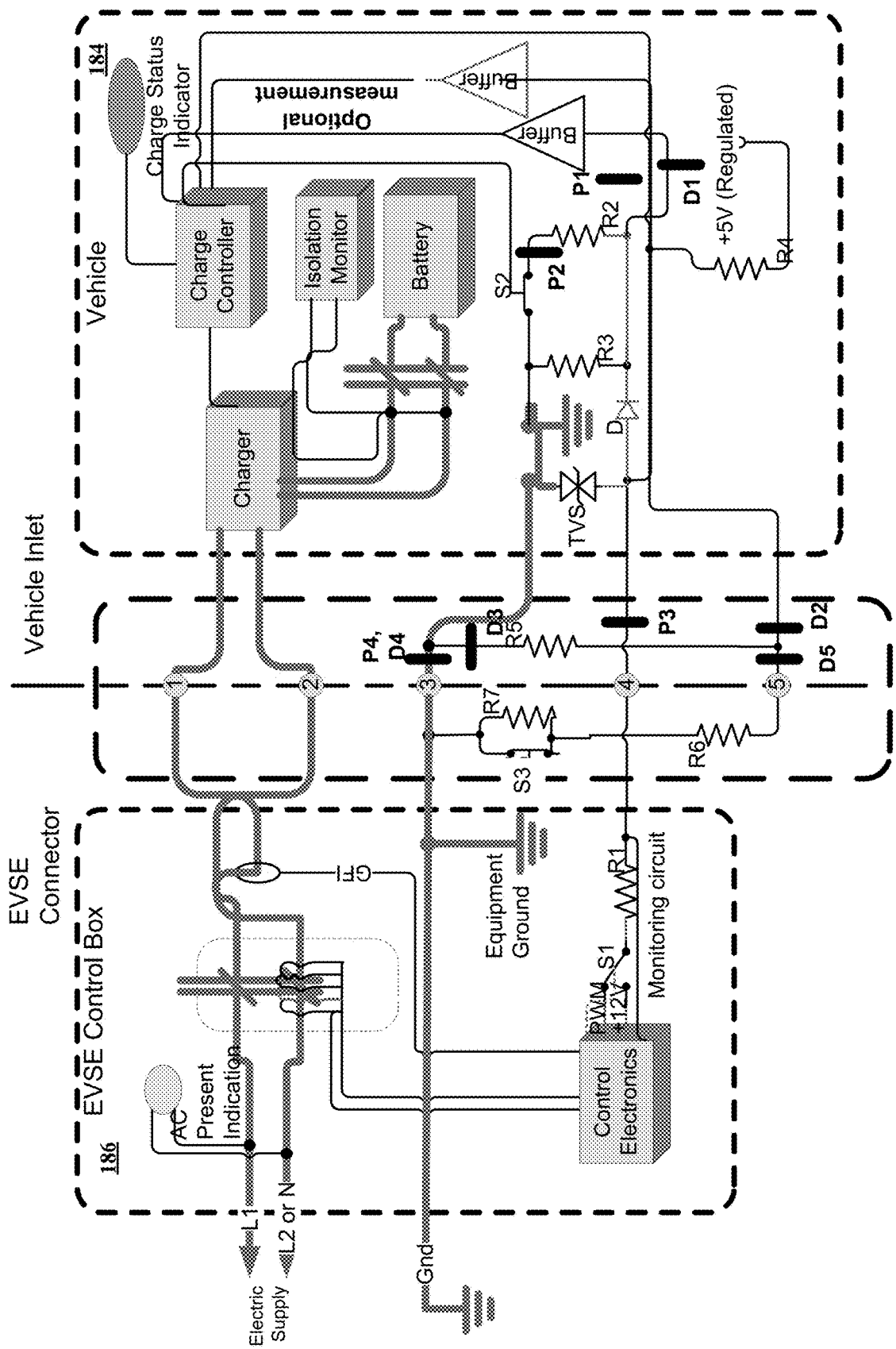
FIG. 4 illustrates a circuit diagram typically interfaced with the exemplary adapter of FIG. 3 in accordance with some embodiments of the present disclosure.

For instance, as a non-limiting example, FIGS. 3 and 4 illustrate an adapter of the present disclosure configured for regulating the charging of an electric vehicle, using open standards such as SAE J1772 and J2836/2. In the illustrated embodiment, the adapter 100 is electrically connected to the first system 184, e.g., a plug-in electric vehicle (PEV), and the second system 186, e.g., an electric vehicle supply equipment (EVSE), for instance, through SAE J1772 connectors or Tesla connectors.

SAE J1772, also known as a J plug or Type 1 connector after its international standard, IEC 62196 Type 1, is a North American standard for electrical connectors for electric vehicles maintained by SAE International under the formal title "SAE Surface Vehicle Recommended Practice J1772, SAE Electric Vehicle Conductive Charge Coupler", which is hereby incorporated by reference in its entirety. SAE J2836/2 is a North American standard for environmental conditions and design practices for automotive electrical/electronic equipment, which specifies diagnostic communication for plug-in electric vehicles.

Figure 6A:
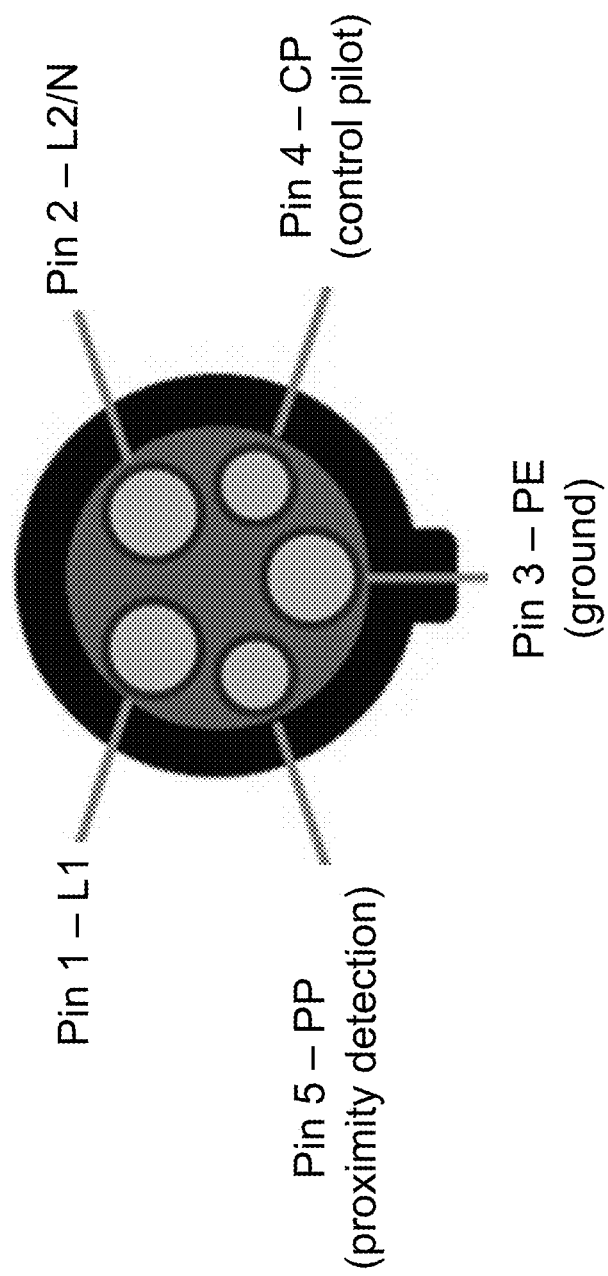
FIG. 6A illustrates a layout of a standard plug, i.e., J Plug.

SAE J1772 is basically a 5 pin connector, as illustrated in FIG. 6A. The main 3 pins connect the Single-Phase AC Line 1 (L1), Neutral AC (N), and Protective Earth (PE) to the EV. The 2 additional pins are the Control Pilot (CP) and Proximity Pilot (PP), operating as safety and communication mechanism between the EV and the charging station. The SAE J1772 connectors are universally used at all non-Tesla Level 1 and Level 2 charging stations in North America. All EV manufacturers, except Tesla, use the J Plugs for charging.

By controlling Pin 3, Pin 4 and/or Pin 5, in particular by controlling the control pilot Pin 4 of the EVSE, the AC power flow of Pin 1 and Pin 2 yield responsive EV loads to the broadcast (e.g., FM broadcast) of utility information. In some embodiments, the control of the pins is essentially a "breakout box" where pins can be swapped with a "man in the middle" circuit that relays and possibly alters the communications between the first system (e.g., PEV) and the second system (e.g., EVSE). Such as breakout box can be mechanized by switches and relays.

For instances, in some embodiments, the control of the Pin 3, Pin 4 and/or Pin 5 emulates a different pin status/condition to achieve the desired amount of current supplied by the AC power Pin 1 and Pin 2. In other words, by manipulating the pins, the adapter can exert control of the charge rate. In some embodiments, the control of the Pin 3, Pin 4 and/or Pin 5 is based at least in part on the utility information, including but not limited to pricing, load, consumer electronics control (CEC), greenhouse gases (GHG), optimal load, hourly percentage, grid status, other information disclosed herein, or any combination thereof.

While FIG. 3 illustrates the adapter 100 electrically connected to the PEV and EVSE through SAE J1772 connectors or Tesla connectors, it should be noted that this is by way of example and is non-limiting. For instance, the adapter of the present disclosure can be configured to comply with other standards, including but not limited to the Japanese, European and Chinese standards illustrated in FIG. 6A. For instance, in an embodiment, the adapter of the present disclosure is configured to be connected to the first and second systems through IEC 62196-2 Type 2 connectors (e.g., ports). IEC 62196 is a series of international standards that define requirements and tests for plugs, socket-outlets, vehicle connectors and vehicle inlets for conductive charging of electric vehicles and is maintained by the technical subcommittee SC 23H "Plugs, Socket-outlets and Couplers for industrial and similar applications, and for Electric Vehicles" of the International Electrotechnical Commission (IEC). IEC 62196-2 Type 2 connector is often referred to as Mennekes connector for the company (Mennekes Elektrotechnik GmbH & Co. KG, a German manufacturer of industrial plugs and connectors). that designed it. Mennekes connector is used for charging electric vehicles, mainly within Europe, as it was declared standard by the EU. In another embodiment, the adapter of the present disclosure is configured to be connected to the first and second systems through GB/t connectors. The GB/T charging standard is a set of GB/T standards, primarily in the GB/T 20234 family, for electric vehicle AC and DC fast charging used in China. The standards were revised and updated most recently in 2015 by the Standardization Administration of China. In a further embodiment, the adapter of the present disclosure is configured to be connected to the first and second systems through CCS1 or CCS 2 connectors. The Combined Charging System (CCS) is a standard for charging electric vehicles. It can use Combo 1 (CCS1) or Combo 2 (CCS2) connectors to provide power at up to 350 kilowatts. These two connectors are extensions of the IEC 62196 Type 1 and Type 2 connectors, with two additional direct current (DC) contacts to allow high-power DC fast charging. In another embodiment, the adapter of the present disclosure is configured to be connected to the first and second systems through CHAdeMo connectors. CHAdeMO is a DC charging standard for electric vehicles and used in Nissan and Mitsubishi cars.

In some embodiments where the adapter of the present disclosure is used with an PEV and an EVSE, the determining of whether the utility information, the adapter, the first system, the second system, or a combination thereof contains a condition that restrains the second system from performing an operation includes determining whether the utility information contains a condition that restrains the EVSE from supplying electric energy to the PEV. When it is determined that the utility information contains a condition that restrains the EVSE from supplying the electric energy to the PEV, the controller 120 controls a signal at a first terminal (e.g., a first outlet terminal) in a plurality of terminals (e.g., outlet terminals) of the EVSE to regulate the EVSE based at least in part on the extracted utility information and the PEV.

In some embodiments, the first terminal in the plurality of terminals of the EVSE is the control pilot terminal (e.g., Pin 4) of the EVSE, and the controller 120 controls the signal at the control pilot terminal to regulate the EVSE based at least in part on the extracted utility information. In some embodiments, the controlled signal is a voltage at the control pilot terminal. In some such embodiments, the voltage at the control pilot terminal is set to a high voltage if it is determined that the utility information contains a condition that restrains the second system from performing the operation. For instance, in some embodiments, the voltage at the control pilot terminal is set to 9 V if it is determined that the utility information contains a condition that restrains the second system from performing the operation. In some embodiments, the voltage at the control pilot terminal is set to at least 9 V, at least 10 V, at least 11 V, or at least 12 V if it is determined that the utility information contains a condition that restrains the second system from performing the operation. In some embodiments, the voltage at the control pilot terminal is set to at most 10 V, at most 11 V, or at most 12 V if it is determined that the utility information contains a condition that restrains the second system from performing the operation.

In some embodiments, the controller 120 controls the signal at the first terminal in the plurality of terminals of the second system to pause, delay, or stop the operation if it is determined that the utility information contains a condition that restrains the second system from performing the operation. For instance, in some embodiments, when it is determined that the utility information contains a condition that restrains the second system (e.g., the EVSE) from supplying the electric energy to the first system (e.g., the PEV), the controller causes the signal at the first terminal of the second system (e.g., the EVSE) to be at a level indicative to the second system (e.g., the EVSE) that the first system (e.g., the PEV) is connected but not ready for charging (e.g., wait for a better price or the cessation of a peak load).

In some embodiments, the controller 120 is further configured to relinquish control over the signal at the first terminal in the plurality of terminals of the second system to the first system, the second system or both, if it is determined that the utility information, the adapter, the first system, the second system, or a combination thereof contains no condition that restrains the second system from performing the operation. For instance, in some embodiments where the adapter is used with an PEV and EVSE, the controller 120 obtains information, such as whether the EVSE is ready to supply the electric energy to the PEV, whether the PEV is ready to accept the electric energy from the EVSE, whether a user of the PEV has provided an override instruction, or any combination thereof. If the EVSE is not ready to supply the electric energy to the PEV, the PEV is not ready to accept the electric energy from the EVSE, the user of the PEV has provided an override instruction, or any combination thereof, the controller 120 relinquishes the control over the signal at the first outlet terminal in the plurality of first outlet terminals of the EVSE to the PEV, the EVSE or both.

In some embodiments, when it is determined that the EVSE is not ready to supply the electric energy to the PEV, the PEV is not ready to accept the electric energy from the EVSE, or any combination thereof, the controller 120 evaluates one or more signals at one or more points on a control pilot circuit, a proximity circuit or both of the control pilot circuit and proximity circuit formed collectively by the PEV and EVSE to detect one or more failure conditions. For instance, the controller 120 evaluates one or more signals at any of the P1, P2, P3, P4, D1, D2, D3, D4, and D5 points illustrated in FIG. 4 to detect one or more failure conditions. In some embodiments, the controller 120 is configured to evaluate signals at 4 points on the control pilot circuit (e.g., P1, P2, P3, and P4) and 5 points on the proximity circuit (e.g., D1, D2, D3, D4 and D5). In some embodiments, the signals to be evaluated are voltages at the plurality of points on the control pilot circuit and/or the proximity circuit.

The evaluation of the one or more signals at one or more points generally follows the SAE J2847 standard, which specifies diagnostic communication for plug-in electric vehicles. In some embodiments, the one or more signals facilitate local intelligence or cloud based intelligence and adaptive behavior. For instance, in an embodiment, the evaluation of the one or more signals is conducted locally, e.g., by the controller (e.g., a processor of the controller), the first system, or the second system. In another embodiment, the evaluation of the one or more signals is conducted remotely, e.g., the data is transferred to a remote server/system through a network such as a cloud-based network and evaluated by the remote server/system.

In some embodiments, the first coupler 160 is a first plug configured to be removably coupled with an inlet port of the PEV that comprises a plurality of inlet terminals. The second coupler 170 is a second plug configured to be removably coupled with an outlet port of the EVSE that comprises the plurality of outlet terminals. In such embodiments, when the first plug is coupled with the inlet port of the PEV and the second plug is coupled with the outlet port of the EVSE, the controller is electrically coupled with the plurality of inlet terminals of the PEV and the plurality of outlet terminals of the EVSE.

In some embodiments, the adapter includes a cable connecting the first and second plugs and serving as an antenna (e.g., the antenna 112 illustrated in FIG. 1) for the receiver. In some embodiments, the antenna is a ¼, ½, or ⅝ wave antenna, or a combination thereof. In some embodiments, the antenna is a wire, or a housing of the adapter.

Figure 5:
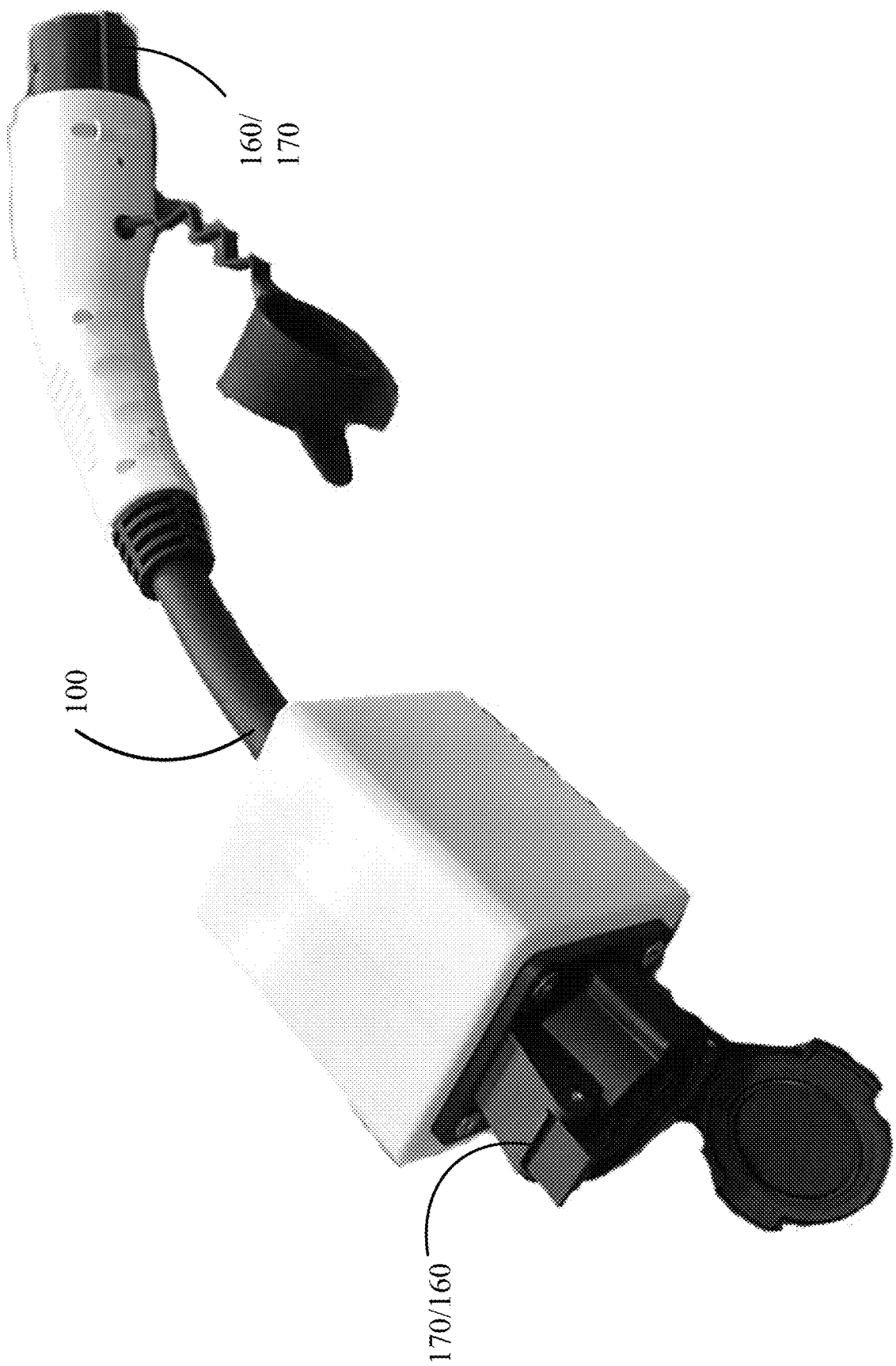
FIG. 5 is a photograph of an exemplary adapter configured for use with an electric vehicle in accordance with some embodiments of the present disclosure.
Figure 6B:
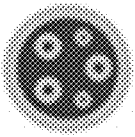
FIG. 6B illustrates standard plugs or connectors.

Referring to FIG. 5, there is shown a photograph of an exemplary adapter configured for use with an electric vehicle in accordance with some embodiments of the present disclosure. The adapter has a shape and/size similar to those in J1772, can be literally plugged to standard ports (e.g., from a male J1772 of an existing EVSE to the female J1772 of the adapter, or from the male J1772 of the adapter to a female J1772 of the PEV, or any of port types shown in FIG. 6B, or the like).

While FIG. 5 shows the adapter having a shape and/size similar to those in J1772, it should be noted that this is by way of example and is non-limiting. The adapter can have any suitable shape/size. Moreover, while FIG. 5 illustrates a standalone adapter, it should be noted that the adapter or some components of the adapter can be embedded in or integrated with (e.g., retrofitted in) the first or second system. For instance, in some embodiments, the receiver and/or controller of the adapter can be embedded in or integrated with the first system (e.g., the PEV). In some other embodiments, the receiver and/or controller of the adapter can be embedded in or integrated with the second system (e.g., the EVSE). For instance, in some embodiments, at least some of the circuits of the receiver or controller can be integrated with the circuits of the first or second system. In some embodiments, the first system (e.g., the PEV) or the second system (e.g., the EVSE) can receive the one or more datacasts, e.g., the first or second system has been installed with the receiver or the circuit of the receiver. In some such embodiments, the adapter can, but is not necessarily have to, include the receiver. In some embodiments, the only need for using an adapter of the present disclosure is to add e-Radio software of the present disclosure via updates of the existing systems or install e-Radio software of the present disclosure in new systems.

Figure 7:
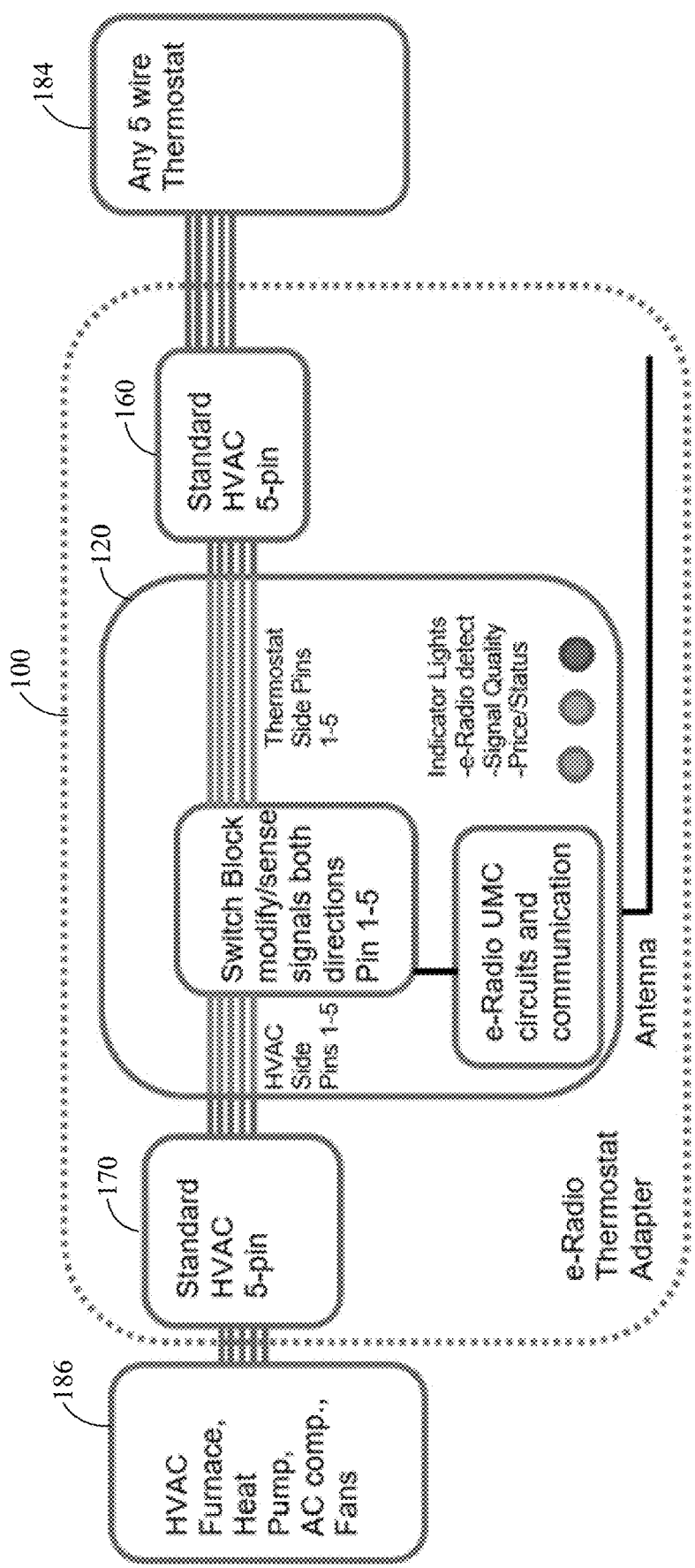
FIG. 7 is a block diagram illustrating an exemplary adapter in use with an appliance in accordance with some embodiments of the present disclosure.
Figure 8A:
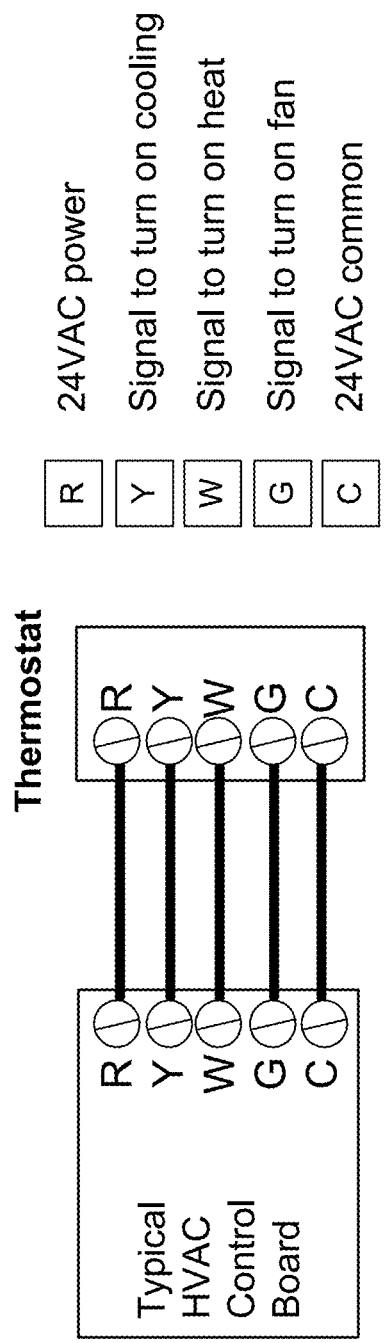
FIG. 8A illustrates an exemplary electrical connection associated with the exemplary adapter of FIG. 7 in accordance with some embodiments of the present disclosure.
Figure 8B:
FIG. 8B illustrates another exemplary electrical connection associated with the exemplary adapter of FIG. 7 in accordance with some embodiments of the present disclosure.

As another non-limiting example, FIGS. 7, 8A and 8B illustrate the adapter of the present disclosure configured for use with an appliance, such as a heating, ventilation and air conditioning (HVAC) system. In the illustrated embodiment, the adapter 100 is electrically connected to the first system 184, e.g., a thermostat, and the second system 186, e.g., the HVAC system, for instance, using standard HVAC connectors or wiring. The thermostat can be, but do not necessarily have to, a programmable communicating thermostat (PCT). In some embodiments, the number of the plurality of terminals of the appliance is the same as a plurality of terminals of the thermostat. In some other embodiments, at least two terminals in the plurality of terminals of the appliance are electrically connected to each other.

The basic concept of an adapter for the thermostat and HVAC is identical or similar to those for the PEV and EVSE disclosed herein. For instance, in some embodiments, breakout box to 4 or 5 wire thermostat wiring is performed to achieve auto-load shift from live FM broadcasts. The control is based at least in part on the utility information (e.g., pricing, load, GHG, grid status, or the like). For instance, by controlling Pin 2 (e.g., the wiring or port, typically in yellow, that carries a signal to turn on cooling), Pin 3 (e.g., the wiring or port, typically in white, that carries a signal to turn on heat), and/or Pin 4 (e.g., the wiring or port, typically in green, that carries a signal to turn on fan), the AC, heat and/or fan operations yield responsive AC compressor or heater loads to the broadcast (e.g., the FM broadcast) of the utility information.

While FIGS. 7, 8A and 8B illustrate the adapter for use with a thermostat and HVAC system, it should be noted that the adapter of the present disclosure can be configured for use with various appliances. Examples of such appliances include, but are not limited to, a clothes dryer, a clothes washer, a refrigerator, a freezer, a central vacuum, a power bar, a hot water heater, a dishwasher, an electrical vehicle, a water pump, a sump pump, a sprinkler system, or a water irrigation pump.

In some embodiments where the adapter of the present disclosure is used with an appliance, the determining of whether the utility information, the adapter, the first system, the second system, or a combination thereof contains a condition that restrains the second system from performing an operation includes determining whether the utility information contains a condition that restrains the appliance from operating based solely on the first system (e.g., the thermostat). When it is determined that the utility information contains a condition that restrains the appliance from operating based solely on the thermostat, the controller 120 controls a signal at a first terminal in a plurality of terminals of the appliance to regulate the appliance based at least in part on the extracted utility information and the first system. For instance, in embodiments wherein the appliance is an HVAC, the controller 120 controls a signal at Pin 2 (e.g., the wiring or port that carries a signal to turn on cooling), Pin 3 (e.g., the wiring or port that carries a signal to turn on heat), Pin 4 (e.g., the wiring or port that carries a signal to turn on fan), or a combination thereof to control the AC, heat and/or fan operations of the HVAC based at least in part on the extracted utility information.

In some embodiments, the controller 120 controls the signal at the first terminal in the plurality of terminals of the second system to pause, delay, or stop the operation if it is determined that the utility information contains a condition that restrains the second system from performing the operation. For instance, in some embodiments, when it is determined that the utility information contains a condition that restrains the second system (e.g., the HVAC) from operating based on the first system (e.g., the setting of the thermostat), the controller causes the signal at the first terminal of the second system (e.g., the HVAC) to be at a level that pauses or stops activation of the HVAC (e.g., wait for a better price or the cessation of a peak load).

In some embodiments, the restraining of the second system from performing the operation is conducted in a most optimal way in accordance with one or more user's goals. For instance, in some embodiments where the adapter of the present disclosure is used with an appliance (e.g., the HVAC), the restraining of the appliance from performing the operation is oriented to meet one or more user's goals (e.g., personal comfort, pricing, timing, etc.) as opposed to power provider based goals.

In some embodiments, the controller 120 is further configured to relinquish control over the signal at the first terminal in the plurality of terminals of the second system to the first system, the second system or both, if it is determined that the utility information, the adapter, the first system, the second system, or a combination thereof contains no condition that restrains the second system from performing the operation. For instance, in some embodiments where the adapter is used with a thermostat and HVAC, the control 120 relinquishes the control over the signal at the first outlet terminal in the plurality of first outlet terminals of the HVAC to the thermostat, the HVAC or both if it is determined that the utility information, the adapter, the thermostat, the HVAC, or a combination thereof contains no condition that restrains the HVAC from performing the operation.

Figure 9:
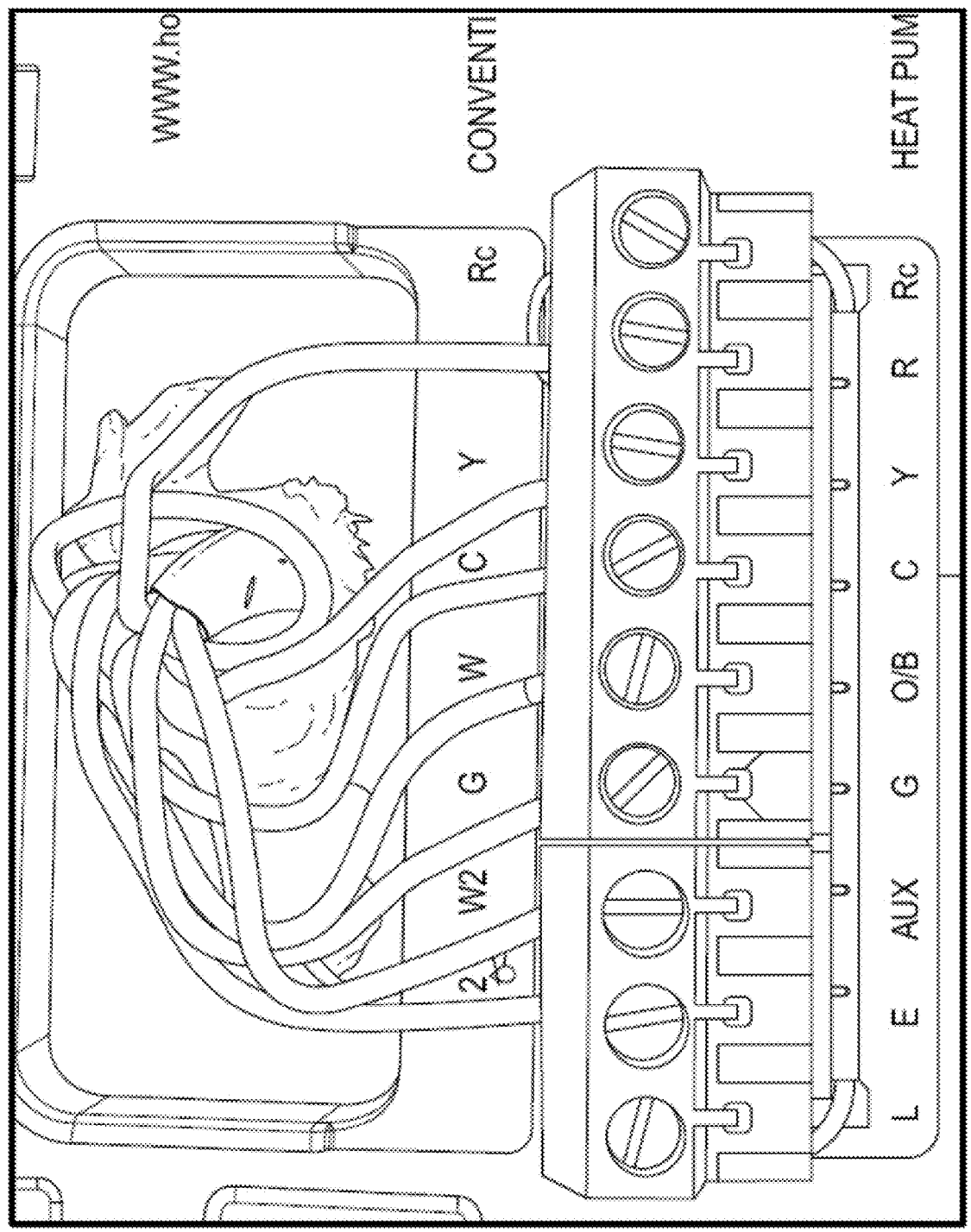
FIG. 9 is a photograph illustrating an exemplary adapter installed on a motherboard in accordance with some embodiments of the present disclosure.

The adapter can be installed at any suitable places. For instance, it can be placed on a motherboard of the thermostat, an above ground adapter plate or a removable/relocatable module. In some embodiments, the adapter includes a hidden module inside dry wall with a pigtail antenna and receiver/processing electronics. In some embodiments, the adapter includes a temperature sensor, one or more adapter plates, one or more colored wires, or any combination thereof. In some embodiments, the adapter includes a module, such as e-Radio CTA 2045 module, or just the electronics housed in a plastic housing. The original PCT would just sit atop in an aesthetically platform. As a non-limiting example, FIG. 9 illustrates e-Radio G2 previously successfully install on motherboard of RCS PCT. This concept can work with all the popular PCT or regular simple thermostats.

In some exemplary embodiments, the adapter includes a cable (e.g., the antenna 112). In an exemplary embodiment, the cable is approximately ¼ wave length of 100 Mhz FM wave, i.e., it is a quarter wave antenna. In another exemplary embodiment, the cable is approximately ½ or ⅝ wavelength of 100 Mhz FM wave.

In some exemplary embodiments, a breakout box can be configured to enable e-Radio UCM DC into breakout adapter (cable, which can be FM antenna).

Referring back to FIG. 1, in some embodiments, the adapter of the present disclosure includes some additional or optional components or features. For instance, in some embodiments, additionally or optionally, the adapter 100 includes a communication interface 142 in electrical communication with the controller and in wireless (e.g., Bluetooth, WiFi, cellular data service, cloud-based network) or wired (e.g., USB, FireWire, cable) communication with a remote device 188. The communication interface 142 can be used for (i) notifying, on the remote device 188, a user of the first or second system the utility information, a state of the first system, a status of the first system, a state of the second system, a status of the second system, any failure condition, or any combination thereof, and/or (ii) receiving an instruction from the user of the first or second system. The remote device can be any device that is suitable for receiving information and/or sending instruction. Examples of such devices include, but are not limited to a smart watch, a mobile phone, a tablet, a laptop computer or a desktop computer.

In some embodiments, additionally or optionally, the adapter 100 includes a user interface 148 in electrical communication with the controller. The user interface 148 can be used for (i) notifying a user of the first or second system the utility information, a state of the first system, a status of the first system, a state of the second system, a status of the second system, any failure condition, or any combination thereof, and/or (ii) receiving an instruction from the user of the first or second system. The user interface 148 may include a display device for presenting data, receiving instructions (e.g., the display device including a touch-sensitive surface), or both. In some embodiments, the user interface 148 includes an optional input device, such as a keyboard, a mouse or the like, for receiving instructions. The user interface 148 may be an integral part of the adapter 100. Alternatively, the user interface 148 may be a part external to the adapter but can be accessed by the controller 120 of the adapter through the communication interface 142.

In some embodiments, additionally or optionally, the adapter 100 includes an indicator 144 in electrical communication with the receiver or the controller. The indicator 144 is configured to indicate whether a validated FM carrier is detected, whether a validated utility message channel (UMC) is detected, whether data from the validated UMC is received, what a quality of signal is, or any combination thereof. In some embodiments, the quality of signal is represented by a packet error rate. In some embodiments, the data from the validated UMC comprises a description of overall utility load, current availabilities of alternative electrical energy supplies, critical price points (CPPs), critical weather warnings, or a combination thereof.

In some embodiments, additionally or optionally, the adapter 100 includes one or more sensors 146. For instance, in some embodiments where the adapter is used with an appliance, the adapter includes a sensor to monitor a temperature of a space, a zone, a room, or a section. The sensor can be embedded in the thermostat or installed in any other locations such as in a room where the temperature needs to be monitored. The sensor can be in wired or wireless communication with the thermostat and/or the controller, for instance, through the communication interface 142.

Figure 10A:
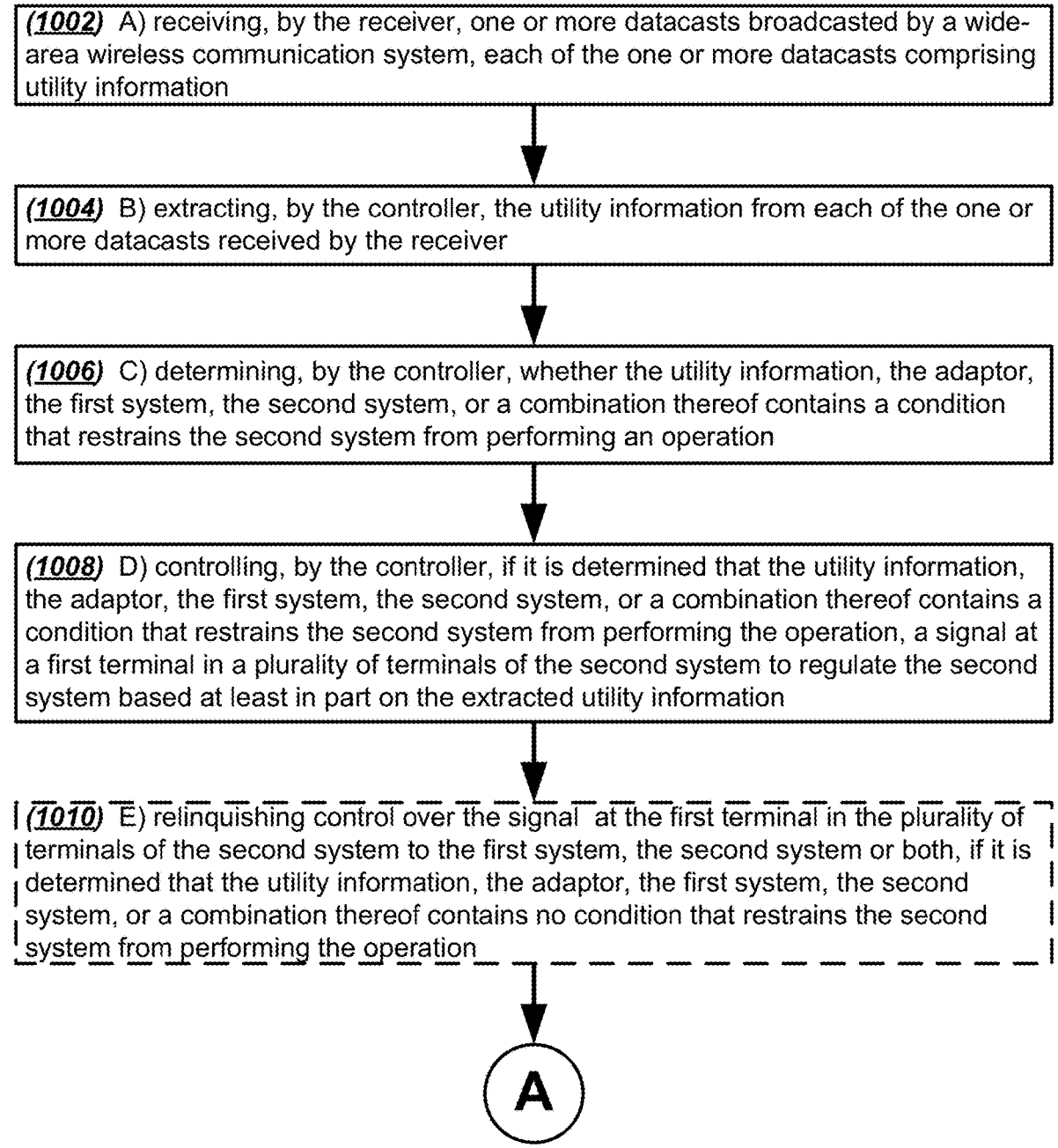
Figure 10B:
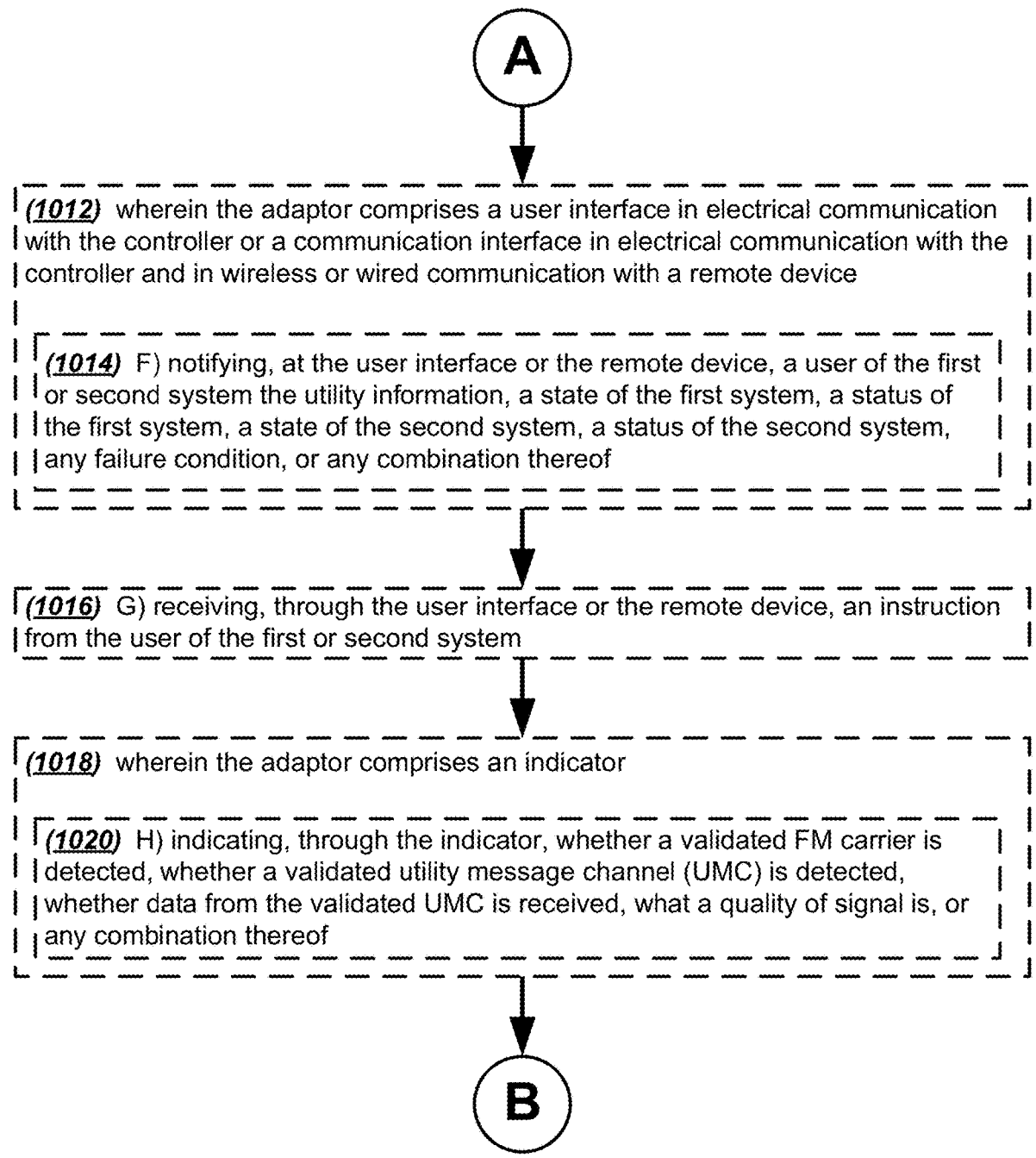

Referring to FIGS. 10A, 10B and 10C, there is depicted an exemplary method 100 in accordance with some embodiments of the present disclosure. The method 100 is conducted in an adapter comprising a receiver and a controller, such as the receiver 110 and controller 120 disclosed herein. The controller is in electrical communication with the receiver and configured to be electrically coupled with a first system and a second system, such as the first system 184 and second system 186 disclosed herein. The controller is configured to execute, alone or in combination with other components (which can be internal parts of the adapter or external parts), the processes in the flowchart. In the flowchart, the preferred parts of the method are shown in solid line boxes, whereas additional, optional, or alterative parts of the method are shown in dashed line boxes. It should be noted that the processes disclosed herein and exemplified in the flowchart can be, but do not have to be, executed in full or in the order as they are presented.

Referring to block 1002, the method includes A) receiving, by the receiver, one or more datacasts broadcasted by a wide-area wireless communication system, each of the one or more datacasts comprising utility information. For instance, in some embodiments, the method includes receiving, by the receiver 110, one or more datacasts broadcasted by the wide-area wireless communication system 182. Each of the one or more received datacasts comprises utility information. In some embodiments, the one or more datacasts are received by the receiver on a recurring or periodic basis.

Referring to block 1004, the method includes B) extracting, by the controller, the utility information from each of the one or more datacasts received by the receiver. For instance, in some embodiments, the method includes extracting, by the controller 120, the utility information from each of the one or more datacasts received by the receiver 110.

Referring to block 1006, the method also includes C) determining, by the controller, whether the utility information, the adapter, the first system, the second system, or a combination thereof contains a condition that restrains the second system from performing an operation. For instance, as a non-limiting example, in some embodiments where the method is applied to an PEV and an EVSE, the method includes determining, by the controller 120, whether the utility information, the adapter, the PEV, the EVSE, a combination thereof contains a condition that restrains the EVSE from performing an operation. As another non-limiting example, in some embodiments where the method is applied to a thermostat and an HVAC, the method includes determining, by the controller 120, whether the utility information, the adapter, the thermostat, the HVAC, a combination thereof contains a condition that restrains the HVAC from performing an operation.

Referring to block 1008, the method further includes D) controlling, by the controller, if it is determined that the utility information, the adapter, the first system, the second system, or a combination thereof contains a condition that restrains the second system from performing the operation, a signal at a first terminal in a plurality of terminals of the second system to regulate the second system based at least in part on the extracted utility information. For instance, as a non-limiting example, in some embodiments where the method is applied to an PEV and an EVSE, the method includes controlling a signal at a terminal (e.g., Pin 4) of the EVSE to regulate the EVSE based at least in part on the extracted utility information when the utility information, the adapter, the PEV, the EVSE, or a combination thereof contains a restraining condition. As another non-limiting example, in some embodiments where the method is applied to a thermostat and an HVAC, the method includes controlling a signal at a terminal (e.g., Pin 2, Pin 3, and/or Pin 4) of the HVAC to regulate the HVAC based at least in part on the extracted utility information when the utility information, the adapter, the thermostat, the HVAC, or a combination thereof contains a restraining condition.

Referring to block 1010, in some embodiments, the method additionally or optionally includes E) relinquishing control over the signal at the first terminal in the plurality of terminals of the second system to the first system, the second system or both, if it is determined that the utility information, the adapter, the first system, the second system, or a combination thereof contains no condition that restrains the second system from performing the operation. For instance, as a non-limiting example, in some embodiments where the method is applied to an PEV and an EVSE, the method includes relinquishing control over the signal at the terminal (e.g., Pin 4) of the EVSE to the PEV, the EVSE or both when the utility information, the adapter, the PEV, the EVSE, or a combination thereof contains no restraining condition. As another non-limiting example, in some embodiments where the method is applied to a thermostat and an HVAC, the method includes relinquishing control over the signal at the terminal (e.g., Pin 2, Pin 3, and/or Pin 4) of the HVAC to the thermostat, the HVAC or both when the utility information, the adapter, the thermostat, the HVAC, or a combination thereof contains no restraining condition.

Referring to blocks 1012 and 1014, in some embodiments, the adapter comprises a user interface in electrical communication with the controller or a communication interface in electrical communication with the controller and in wireless or wired communication with a remote device. In some such embodiments, additionally or optionally, the method includes F) notifying, at the user interface or the remote device, a user of the first or second system the utility information, a state of the first system, a status of the first system, a state of the second system, a status of the second system, any failure condition, or any combination thereof. For instance, as a non-limiting example, in some embodiments where the method is applied to an PEV and an EVSE, the method includes notifying, at the user interface 148 or the remote device 188, a user of the PEV or EVSE, whether the EVSE is ready to supply the electric energy to the PEV, whether the PEV is ready to accept the electric energy from the EVSE, and/or other information. As another non-limiting example, in some embodiments where the method is applied to a thermostat and an HVAC, the method includes notifying, at the user interface 148 or the remote device 188, a user of the thermostat or HVAC (e.g., a home owner) the AC compressor or heater loads, and/or other information.

Referring to block 1016, in some embodiments, additionally or optionally, the method includes G) receiving, through the user interface or the remote device, an instruction from the user of the first or second system. In some embodiments, the instruction from the user includes an override instruction. When an override instruction is received from the user, the method does not regulate the second system based on the one or more datacasts and subsequent datacasts until such a time that a further instruction is received from the user. For instance, in some embodiments, when the instruction from the user includes an override instruction, the method relinquishes the control over the signal at the first terminal in the plurality of terminals of the second system to the first system, the second system or both, as disclosed herein.

Referring to blocks 1018 and 1020, in some embodiments, the adapter comprises an indicator, such as the indicator 144. In some such embodiments, additionally or optionally, the method includes H) indicating, through the indicator, whether a validated FM carrier is detected, whether a validated utility message channel (UMC) is detected, whether data from the validated UMC is received, what a quality of signal is, or any combination thereof.

Referring to block 1022 through block 1028, in some embodiments, the first system is a plug-in electric vehicle (PEV), and the second system is an electric vehicle supply equipment (EVSE). In some such embodiments, the determining C) determines whether the utility information contains a condition that restrains the EVSE from supplying electric energy to the PEV. When it is determined that the utility information contains a restraining condition, the controlling D) controls a signal at the first outlet terminal in a plurality of first outlet terminals of the EVSE to regulate the EVSE based at least in part on the extracted utility information.

In some embodiments, additionally or optionally, the method further includes I) obtaining information regarding whether the EVSE is ready to supply electric energy to the PEV, whether the PEV is ready to accept the electric energy from the EVSE, and/or whether a user of the PEV has provided an override instruction. The obtaining I) can be performed at any suitable time or time period. For instance, in an embodiment, the obtaining I) is performed prior to the determining C). In another embodiment, the obtaining I) is performed subsequent to the determining C) but prior to the controlling D).

Referring to block 1030, in some embodiments, additionally or optionally, the method includes J) relinquishing control over the signal at the first outlet terminal to the PEV and/or EVSE, if it is determined that the EVSE is not ready to supply the electric energy to the PEV, the PEV is not ready to accept the electric energy from the EVSE, the user of the PEV has provided an override instruction, or any combination thereof.

Referring to block 1032, in some embodiments, additionally or optionally, the method includes K) evaluating one or more signals at one or more points on a control pilot circuit, a proximity circuit or both of the control pilot circuit and proximity circuit formed collectively by the PEV and EVSE to detect one or more failure conditions, if it is determined that the EVSE is not ready to supply the electric energy to the PEV, and/or the PEV is not ready to accept the electric energy from the EVSE. In some embodiments, the method includes evaluating one or more signals at any of the P1, P2, P3, P4, D1, D2, D3, D4, and D5 points illustrated in FIG. 4. In some embodiments, the method includes evaluates signals at 4 points on the control pilot circuit (e.g., P1, P2, P3, and P4) and 5 points on the proximity circuit (e.g., D1, D2, D3, D4 and D5). In some embodiments, the signals to be evaluated are voltages at the plurality of points on the control pilot circuit and/or the proximity circuit.

The adapters and methods disclosed herein meet the SAE standards, and have a number of advantages. For instance, by manipulating the wire(s) or pin(s), they enable control of the operation (e.g., charging rate) of a system without causing error conditions. In some embodiments, they are backwards and forward compatible with all PEVs with J1772, Tesla plug or other standard connectors and enable all past, current, future PEV/EVSE charging. In some embodiments, the adapters and methods disclosed herein provide automatic communication and operations: just plug it in, no other action is required. In some embodiments, the adapters and methods disclosed herein enable retrofit and future install to all PEVs via a variety of global PEV adapters. In some cases, the only need for using the adapters is to add e-Radio software via updates. In some embodiments, the adapters and method disclosed herein include functions the same as or similar to those disclosed in SAE J2836/2 for diagnostic communication for plug-in electric vehicles. In some embodiments, the adapters and methods disclosed herein are primarily applicable for Level 1 and level 2 (multiple hours) charging at home and/or office. In some embodiment, the adapter or some components (e.g., the receiver, controller) are embedded in or integrated with the systems to be controlled by the adapter. In some embodiments, the adapters and methods disclosed herein use the one or more datacasts from a system (e.g., an PEV having a built-in or pre-installed receiver) with capability of receiving the one or more datacasts). In such embodiments, the adapters of the present disclosure can but do not have to include a receiver.

Additional Implementations

Implementation 1: An adapter comprises: a receiver configured to receive one or more datacasts broadcasted by a wide-area communication system, each of the one or more datacasts comprising utility information; and a controller in electrical communication with the receiver and configured to be electrically coupled with a first system and a second system, wherein the controller is configured to: extract the utility information from each of the one or more datacasts received by the receiver or obtain the utility information from the receiver; determine whether the utility information, the adapter, the first system, the second system, or a combination thereof contains a condition that restrains the second system from performing an operation; and control, when it is determined that the utility information, the adapter, the first system, the second system, or a combination thereof contains a condition that restrains the second system from performing the operation, a signal at a first terminal in a plurality of terminals of the second system to regulate the second system based at least in part on the extracted utility information.

Implementation 2: The adapter of Implementation 1, wherein the controller is further configured to: relinquish control over the signal at the first terminal in the plurality of terminals of the second system to the first system, the second system or both, if it is determined that the utility information, the adapter, the first system, the second system, or a combination thereof contains no condition that restrains the second system from performing the operation.

Implementation 3: The adapter of Implementation 1 or Implementation 2, further includes: a user interface in electrical communication with the controller for (i) notifying, on a remote device, a user of the first or second system the utility information, a state of the first system, a status of the first system, a state of the second system, a status of the second system, any failure condition, or any combination thereof, and/or (ii) receiving an instruction from the user of the first or second system.

Implementation 4: The adapter of any one of Implementations 1-3, further includes: a communication interface in electrical communication with the controller and in wireless or wired communication with a remote device for (i) notifying, on the remote device, a user of the first or second system the utility information, a state of the first system, a status of the first system, a state of the second system, a status of the second system, any failure condition, or any combination thereof, and/or (ii) receiving an instruction from the user of the first or second system.

Implementation 5: The adapter of Implementation 4, wherein the remote device is a smart watch, a mobile phone, a tablet, a laptop computer or a desktop computer.

Implementation 6: The adapter of any one of Implementations 1-5, further includes: an indicator configured to indicate whether a validated FM carrier is detected, whether a validated utility message channel (UMC) is detected, whether data from the validated UMC is received, what a quality of signal is, or any combination thereof.

Implementation 7: The adapter of Implementation 7, wherein the quality of signal is represented by a packet error rate.

Implementation 8: The adapter of Implementation 6 or Implementation 7, wherein the data from the validated UMC comprises a description of overall utility load, current availabilities of alternative electrical energy supplies, critical price points (CPPs), critical weather warnings, or a combination thereof.

Implementation 9: The adapter of any one of Implementations 1-8, wherein the receiver comprises an antenna, wherein the antenna is a wire, or a housing of the adapter.

Implementation 10: The adapter of any one of Implementations 1-9, wherein the controller controls the signal at the first terminal in the plurality of terminals of the second system to pause, delay, or stop the operation if it is determined that the utility information contains a condition that restrains the second system from performing the operation.

Implementation 11: The adapter of Implementation 10, wherein the restraining of the second system from performing the operation is conducted in a most optimal way in accordance with one or more user's goals.

Implementation 12: The adapter of Implementation 10, wherein the condition that restrains the second system from performing the operation comprises (i) during a period of peak demand, (ii) when a real-time price is higher than an acceptable price preset by a user of the first or second system, (iii) signal interruption, (iv) switches being "normally closed", (v) the adapter being "fail safe" or "fail to normal", (vi) the first system being "fail safe" or "fail to normal", (vii) the second system being "fail safe" or "fail to normal", or any combination thereof.

Implementation 13: The adapter of any one of Implementations 1-12, wherein the first terminal in the plurality of terminals of the second system is a control pilot terminal, and the controlled signal is a voltage at the control pilot terminal.

Implementation 14: The adapter of Implementation 13, wherein the voltage at the control pilot terminal is set to a high voltage if it is determined that the utility information contains a condition that restrains the second system from performing the operation.

Implementation 15: The adapter of Implementation 14, wherein the voltage at the control pilot terminal is set to 9 V if it is determined that the utility information contains a condition that restrains the second system from performing the operation.

Implementation 16: The adapter of any one of Implementations 1-15, wherein the receiver, the controller or both are integrated with or embedded in the first system.

Implementation 17: The adapter of any one of Implementations 1-15, wherein the receiver, the controller or both are integrated with or embedded in the second system.

Implementation 18: The adapter of any one of Implementations 1-17, wherein the receiver comprises an RDS/RBDS or IBOC radio receiver.

Implementation 19: The adapter of any one of Implementations 1-18, wherein a datacast in the one or more datacasts is carried by an analog cellular signal, a digital cellular signal, a general packet radio service signal, an enhanced data rate for GSM evolution (EDGE) service signal, a Mobitex signal, two-way paging signal, a signal in the Ardis network, a satellite signal, a WiMAX signal, an AM carrier wave, a high definition radio carrier wave, a TV signal, or a satellite radio signal.

Implementation 20: The adapter of any one of Implementations 1-18, wherein a datacast in the one or more datacasts is carried by an FM carrier wave or a signal in a frequency range between 160 MHz and 167 MHz.

Implementation 21: The adapter of any one of Implementations 1-18, wherein a datacast in the one or more datacasts is carried on a sideband or subcarrier frequency of a carrier wave.

Implementation 22: The adapter of any one of Implementations 1-21, wherein a datacast in the one or more datacasts is responsive to a frequency adjustment made by a utility provider in order to match actual demand to that of available power generating resources.

Implementation 23: The adapter of any one of Implementations 1-22, wherein the one or more datacasts are received by the receiver on a recurring or periodic basis.

Implementation 24: The adapter of any one of Implementations 1-23, wherein the utility information comprises electric grid load information or electric tariff information.

Implementation 25: The adapter of Implementation 24, wherein the electric tariff information is a qualified power tariff data set comprising a price per unit energy consumed, commencement and expiry time points, one or more applicable geographical areas, one or more applicable electrical grid areas or networks, or any combination thereof.

Implementation 26: The adapter of any one of Implementations 1-25, wherein: the first system is a plug-in electric vehicle (PEV); the second system is an electric vehicle supply equipment (EVSE); and the controller is configured to determine whether the utility information contains a condition that restrains the EVSE from supplying electric energy to the PEV; and control, when it is determined that the utility information contains a condition that restrains the EVSE from supplying the electric energy to the PEV, a signal at a first outlet terminal in a plurality of first outlet terminals of the EVSE to regulate the EVSE based at least in part on the extracted utility information and the PEV.

Implementation 27: The adapter of Implementation 26, wherein when it is determined that the utility information contains a condition that restrains the EVSE from supplying the electric energy to the PEV, the controller causes the signal at the first outlet terminal of the EVSE to be at a level indicative to the EVSE that the PEV is connected but not ready for charging.

Implementation 28: The adapter of Implementation 26 or Implementation 27, wherein the controller is further configured to: obtain information regarding whether the EVSE is ready to supply the electric energy to the PEV, whether the PEV is ready to accept the electric energy from the EVSE, and/or whether a user of the PEV has provided an override instruction.

Implementation 29: The adapter of Implementation 28, wherein the controller is further configured to: relinquish control over the signal at the first outlet terminal in the plurality of first outlet terminals of the EVSE to the PEV, the EVSE or both, if it is determined that the EVSE is not ready to supply the electric energy to the PEV, the PEV is not ready to accept the electric energy from the EVSE, the user of the PEV has provided an override instruction, or any combination thereof.

Implementation 30: The adapter of Implementation 29, wherein the controller is further configured to: evaluate one or more signals at one or more points on a control pilot circuit, a proximity circuit or both of the control pilot circuit and proximity circuit formed collectively by the PEV and EVSE to detect one or more failure conditions, if it is determined that the EVSE is not ready to supply the electric energy to the PEV, the PEV is not ready to accept the electric energy from the EVSE, or any combination thereof.

Implementation 31: The adapter of Implementation 30, wherein the one or more signals facilitate local intelligence or cloud based intelligence and adaptive behavior.

Implementation 32: The adapter of Implementation 30 or Implementation 31, wherein the controller is configured to evaluate signals at 4 points on the control pilot circuit and 5 points on the proximity circuit.

Implementation 33: The adapter of any one of Implementations 30-32, wherein the signals to be evaluated are voltages at the plurality of points on the control pilot circuit and the proximity circuit.

Implementation 34: The adapter of any one of Implementations 26-33, further includes: a first plug configured to be removably coupled with an inlet port of the PEV, wherein the inlet port of the PEV comprises a plurality of inlet terminals; and a second plug configured to be removably coupled with an outlet port of the EVSE, wherein the outlet port of the EVSE comprises the plurality of outlet terminals; wherein when the first plug is coupled with the inlet port of the PEV and the second plug is coupled with the outlet port of the EVSE, the controller is electrically coupled with the plurality of inlet terminals of the PEV and the plurality of outlet terminals of the EVSE.

Implementation 35: The adapter of Implementation 34, further includes a cable connecting the first and second plugs and serving as an antenna for the receiver.

Implementation 36: The adapter of Implementation 35, wherein the antenna is a ¼, ½, or ⅝ wave antenna, or a combination thereof.

Implementation 37: The adapter of any one of Implementations 34-36, wherein the inlet port of the PEV is one of a J1772 port, a Mennekes port, a GB/T port, a CCS1 port, a CCS2 port, a CHAdeMo port and a Tesla port, and the outlet port of the EVSE is one of one of a J1772 port, a Mennekes port, a GB/T port, a CCS1 port, a CCS2 port, a CHAdeMo port and a Tesla port.

Implementation 38: The adapter of any one of Implementations 1-25, wherein: the first system is a thermostat; the second system is an appliance; and the controller is configured to determine whether the utility information contains a condition that restrains the appliance from operating based solely on the thermostat; and control, when it is determined that the utility information contains a condition that restrains the appliance from operating based solely on the thermostat, a signal at a first terminal in a plurality of terminals of the appliance to regulate the appliance based at least in part on the extracted utility information and the thermostat.

Implementation 39: The adapter of Implementation 38, further includes: a sensor to monitor a temperature of a space, a zone, a room, or a section.

Implementation 40: The adapter of Implementation 38 or Implementation 39, wherein the appliance is a heating, ventilation and air conditioning system (HVAC).

Implementation 41: The adapter of any one of Implementations 38-40, wherein the thermostat is a programmable communication thermostat or non-programmable communication thermostat.

Implementation 42: The adapter of any one of Implementations 38-41, the adapter is configured to be hidden inside a dry wall with a pigtail antenna for the receiver disposed outside of the dry wall.

Implementation 43: The adapter of any one of Implementations 38-42, wherein the adapter is configured to be installed on a motherboard of the thermostat, an above ground adapter plate or a removable/relocatable module.

Implementation 44: The adapter of any one of Implementations 38-43, wherein the number of the plurality of terminals of the appliance is the same as a plurality of terminals of the thermostat.

Implementation 45: The adapter of any one of Implementations 38-43, wherein at least two terminals in the plurality of terminals of the appliance are electrically connected to each other.

Implementation 46: An adapter for regulating charging of a plug-in electric vehicle (PEV) includes a first plug configured to be removably coupled with an inlet port of the PEV, wherein the inlet port of the PEV comprises a plurality of inlet terminals, wherein the plurality of inlet terminals comprises a control pilot terminal; a second plug configured to be removably coupled with an outlet port of an electric vehicle supply equipment (EVSE), wherein the outlet port of the EVSE comprises a plurality of outlet terminals; a receiver configured to receive one or more datacasts broadcasted by a wide-area wireless communication system, each of the one or more datacasts comprising utility information; and a controller in electrical communication with the receiver, and configured to be electrically coupled with the plurality of inlet terminals of the PEV and the plurality of outlet terminals of the EVSE when the first plug is coupled with the inlet port of the PEV and the second plug is coupled with the outlet port of the EVSE, wherein the controller is configured to: extract the utility information from each of the one or more datacasts received by the receiver; and control a signal at the control pilot terminal of the EVSE to regulate charging of the PEV based at least in part on the extracted utility information.

Implementation 47: The adapter of Implementation 46, further includes a cable connecting the first and second plugs and serving as an antenna for the receiver.

Implementation 48: A method is performed in an adapter comprising a receiver and a controller, wherein the controller is in electrical communication with the receiver and configured to be electrically coupled with a first system and a second system. The method comprises: A) receiving, by the receiver, one or more datacasts broadcasted by a wide-area wireless communication system, each of the one or more datacasts comprising utility information; B) extracting, by the controller, the utility information from each of the one or more datacasts received by the receiver; C) determining, by the controller, whether the utility information, the adapter, the first system, the second system, or a combination thereof contains a condition that restrains the second system from performing an operation; and D) controlling, by the controller, if it is determined that the utility information, the adapter, the first system, the second system, or a combination thereof contains a condition that restrains the second system from performing the operation, a signal at a first terminal in a plurality of terminals of the second system to regulate the second system based at least in part on the extracted utility information.

Implementation 49: The method of Implementation 48, further includes: E) relinquishing control over the signal at the first terminal in the plurality of terminals of the second system to the first system, the second system or both, if it is determined that the utility information, the adapter, the first system, the second system, or a combination thereof contains no condition that restrains the second system from performing the operation.

Implementation 50: The method of Implementation 48 or Implementation 49, wherein the adapter comprises a user interface in electrical communication with the controller or a communication interface in electrical communication with the controller and in wireless or wired communication with a remote device. The method further includes: F) notifying, at the user interface or the remote device, a user of the first or second system the utility information, a state of the first system, a status of the first system, a state of the second system, a status of the second system, any failure condition, or any combination thereof.

Implementation 51: The method of Implementation 50, further includes: G) receiving, through the user interface or the remote device, an instruction from the user of the PEV.

Implementation 52: The method of any one of Implementations 48-51, wherein the adapter comprises an indicator, further includes: H) indicating, through the indicator, whether a validated FM carrier is detected, whether a validated utility message channel (UMC) is detected, whether data from the validated UMC is received, what a quality of signal is, or any combination thereof.

Implementation 53: The method of any one of Implementations 48-52, wherein the one or more datacasts are received by the receiver on a recurring or periodic basis.

Implementation 54: The method of any one of Implementations 48-53, wherein the first system is a plug-in electric vehicle (PEV), the second system is an electric vehicle supply equipment (EVSE), the determining C) determines whether the utility information contains a condition that restrains the EVSE from supplying electric energy to the PEV, and the controlling D) controls, when it is determined that the utility information contains a condition that restrains the EVSE from supplying the electric energy to the PEV, a signal at the first outlet terminal in a plurality of first outlet terminals of the EVSE to regulate the EVSE based at least in part on the extracted utility information. The method further includes: I) obtaining information regarding whether the EVSE is ready to supply electric energy to the PEV, whether the PEV is ready to accept the electric energy from the EVSE, and/or whether a user of the PEV has provided an override instruction.

Implementation 55: The method of Implementation 54, wherein the obtaining I) is performed prior to the determining C).

Implementation 56: The method of Implementation 54, wherein the obtaining I) is performed subsequent to the determining C) but prior to the controlling D).

Implementation 57: The method of any one of Implementations 54-56, further includes: J) relinquishing control over the signal at the first outlet terminal to the PEV and/or EVSE, if it is determined that the EVSE is not ready to supply the electric energy to the PEV, the PEV is not ready to accept the electric energy from the EVSE, and/or the user of the PEV has provided an override instruction.

Implementation 58: The method of any one of Implementations 54-56, further includes: K) evaluating one or more signals at one or more points on a control pilot circuit, a proximity circuit or both of the control pilot circuit and proximity circuit formed collectively by the PEV and EVSE to detect one or more failure conditions, if it is determined that the EVSE is not ready to supply the electric energy to the PEV, and/or the PEV is not ready to accept the electric energy from the EVSE.

Implementation 59: The method of Implementation 58, wherein the evaluating K) comprises evaluating 4 points on the control pilot circuit and 5 points on the proximity circuit.

Implementation 60: The method of Implementation 58 or Implementation 59, wherein the signals to be evaluated are voltages at the plurality of points on the control pilot circuit and the proximity circuit.

All references cited herein are incorporated herein by reference in their entirety and for all purposes to the same extent as if each individual publication or patent or patent application was specifically and individually indicated to be incorporated by reference in its entirety for all purposes.

What is claimed is:

1. An adapter comprising:
a receiver configured to receive one or more datacasts broadcasted by a wide-area communication system, each of the one or more datacasts comprising utility information; and
a controller in electrical communication with the receiver and configured to be electrically coupled with a first system and a second system, wherein the controller is configured to:
extract the utility information from each of the one or more datacasts received by the receiver or obtain the utility information from the receiver;
determine whether the utility information, the adapter, the first system, the second system, or a combination thereof contains a condition that restrains the second system from performing an operation; and
control, when it is determined that the utility information, the adapter, the first system, the second system, or a combination thereof contains a condition that restrains the second system from performing the operation, a signal at a first terminal in a plurality of terminals of the second system to regulate the second system based at least in part on the extracted utility information.

2. The adapter of claim 1, wherein the controller is further configured to:
relinquish control over the signal at the first terminal in the plurality of terminals of the second system to the first system, the second system or both, if it is determined that the utility information, the adapter, the first system, the second system, or a combination thereof contains no condition that restrains the second system from performing the operation.

3. The adapter of claim 1, further comprising:
a user interface in electrical communication with the controller for (i) notifying a user of the first or second system the utility information, a state of the first system, a status of the first system, a state of the second system, a status of the second system, any failure condition, or any combination thereof, and/or (ii) receiving an instruction from the user of the first or second system.

4. The adapter of claim 1, further comprising:
a communication interface in electrical communication with the controller and in wireless or wired communication with a remote device for (i) notifying, on the remote device, a user of the first or second system the utility information, a state of the first system, a status of the first system, a state of the second system, a status of the second system, any failure condition, or any combination thereof, and/or (ii) receiving an instruction from the user of the first or second system.

5. The adapter of claim 1, further comprising:
an indicator configured to indicate whether a validated FM carrier is detected, whether a validated utility message channel (UMC) is detected, whether data from the validated UMC is received, what a quality of signal is, or any combination thereof.

6. The adapter of claim 1, wherein the controller controls the signal at the first terminal in the plurality of terminals of the second system to pause, delay, or stop the operation if it is determined that the utility information contains a condition that restrains the second system from performing the operation.

7. The adapter of claim 6, wherein the condition that restrains the second system from performing the operation comprises (i) during a period of peak demand, (ii) when a real-time price is higher than an acceptable price preset by a user of the first or second system, (iii) signal interruption, (iv) switches being "normally closed", (v) the adapter being "fail safe" or "fail to normal", (vi) the first system being "fail safe" or "fail to normal", (vii) the second system being "fail safe" or "fail to normal", or any combination thereof.

8. The adapter of claim 1, wherein the first terminal in the plurality of terminals of the second system is a control pilot terminal, and the controlled signal is a voltage at the control pilot terminal.

9. The adapter of claim 8, wherein the voltage at the control pilot terminal is set to a high voltage if it is determined that the utility information contains a condition that restrains the second system from performing the operation.

10. The adapter of claim 1, wherein a datacast in the one or more datacasts is carried by an analog cellular signal, a digital cellular signal, a general packet radio service signal, an enhanced data rate for GSM evolution (EDGE) service signal, a Mobitex signal, two-way paging signal, a signal in the Ardis network, a satellite signal, a WiMAX signal, an AM carrier wave, a high definition radio carrier wave, a TV signal, a satellite radio signal, a local area network (LAN) carrier, or carried by an FM carrier wave or a signal in a frequency range between 160 MHz and 167 MHZ, or carried on a sideband or subcarrier frequency of a carrier wave.

11. The adapter of claim 1, wherein:
the first system is a plug-in electric vehicle (PEV);
the second system is an electric vehicle supply equipment (EVSE); and
the controller is configured to
determine whether the utility information contains a condition that restrains the EVSE from supplying electric energy to the PEV; and
control, when it is determined that the utility information contains a condition that restrains the EVSE from supplying the electric energy to the PEV, a signal at a first outlet terminal in a plurality of first outlet terminals of the EVSE to regulate the EVSE based at least in part on the extracted utility information and the PEV.

12. The adapter of claim 11, wherein the controller is further configured to:
obtain information regarding whether the EVSE is ready to supply the electric energy to the PEV, whether the PEV is ready to accept the electric energy from the EVSE, and/or whether a user of the PEV has provided an override instruction; and
relinquish control over the signal at the first outlet terminal in the plurality of first outlet terminals of the EVSE to the PEV, the EVSE or both, if it is determined that the EVSE is not ready to supply the electric energy to the PEV, the PEV is not ready to accept the electric energy from the EVSE, the user of the PEV has provided an override instruction, or any combination thereof.

13. The adapter of claim 12, wherein the controller is further configured to:
evaluate one or more signals at one or more points on a control pilot circuit, a proximity circuit or both of the control pilot circuit and proximity circuit formed collectively by the PEV and EVSE to detect one or more failure conditions, if it is determined that the EVSE is not ready to supply the electric energy to the PEV, the PEV is not ready to accept the electric energy from the EVSE, or any combination thereof.

14. The adapter of claim 13, wherein the controller is configured to evaluate signals at 4 points on the control pilot circuit and 5 points on the proximity circuit.

15. The adapter of claim 11, further comprising:
a first plug configured to be removably coupled with an inlet port of the PEV, wherein the inlet port of the PEV comprises a plurality of inlet terminals; and
a second plug configured to be removably coupled with an outlet port of the EVSE, wherein the outlet port of the EVSE comprises the plurality of outlet terminals;
wherein when the first plug is coupled with the inlet port of the PEV and the second plug is coupled with the outlet port of the EVSE, the controller is electrically coupled with the plurality of inlet terminals of the PEV and the plurality of outlet terminals of the EVSE.

16. The adapter of claim 15, further comprising a cable connecting the first and second plugs and serving as an antenna for the receiver.

17. The adapter of claim 1, wherein:
the first system is a thermostat;
the second system is an appliance; and
the controller is configured to
determine whether the utility information contains a condition that restrains the appliance from operating based solely on the thermostat; and
control, when it is determined that the utility information contains a condition that restrains the appliance from operating based solely on the thermostat, a signal at a first terminal in a plurality of terminals of the appliance to regulate the appliance based at least in part on the extracted utility information and the thermostat.

18. The adapter of claim 17, further comprising:
a sensor to monitor a temperature of a space, a zone, a room, or a section.

19. The adapter of claim 17, wherein the appliance is a heating, ventilation and air conditioning system (HVAC).

20. An adapter for regulating charging of a plug-in electric vehicle (PEV), the adapter comprising:
a first plug configured to be removably coupled with an inlet port of the PEV, wherein the inlet port of the PEV comprises a plurality of inlet terminals, wherein the plurality of inlet terminals comprises a control pilot terminal;
a second plug configured to be removably coupled with an outlet port of an electric vehicle supply equipment (EVSE), wherein the outlet port of the EVSE comprises a plurality of outlet terminals;
a receiver configured to receive one or more datacasts broadcasted by a wide-area wireless communication system, each of the one or more datacasts comprising utility information; and
a controller in electrical communication with the receiver, and configured to be electrically coupled with the plurality of inlet terminals of the PEV and the plurality of outlet terminals of the EVSE when the first plug is coupled with the inlet port of the PEV and the second plug is coupled with the outlet port of the EVSE, wherein the controller is configured to:
extract the utility information from each of the one or more datacasts received by the receiver; and
control a signal at the control pilot terminal of the EVSE to regulate charging of the PEV based at least in part on the extracted utility information.

21. The adapter of claim 20, further comprising a cable connecting the first and second plugs and serving as an antenna for the receiver.

* * * * *